(12) United States Patent
Kimura et al.

(10) Patent No.: US 6,401,352 B1
(45) Date of Patent: Jun. 11, 2002

(54) LINEAR MEASURING MACHINE

(75) Inventors: Kazuhiko Kimura, Utsunomiya; Tadashi Shoganji, Kure; Kenji Kojima, Utsunomiya, all of (JP)

(73) Assignee: Mitutoyo Corporation, Kanagawa (JP)

( * ) Notice: Subject to any disclaimer, the term of this patent is extended or adjusted under 35 U.S.C. 154(b) by 70 days.

(21) Appl. No.: 09/671,145

(22) Filed: Sep. 28, 2000

(30) Foreign Application Priority Data

| Oct. 1, 1999 | (JP) | 11-281557 |
| Oct. 1, 1999 | (JP) | 11-281558 |
| Oct. 1, 1999 | (JP) | 11-281559 |
| Oct. 1, 1999 | (JP) | 11-281560 |

(51) Int. Cl.⁷ .............. G01B 5/02; G01B 7/02
(52) U.S. Cl. .................. 33/832; 33/703
(58) Field of Search .......... 33/556, 703, 832, 33/833

(56) References Cited

U.S. PATENT DOCUMENTS

| 4,276,696 A | 7/1981 | Ernst | 33/558 |
| 4,459,755 A * | 7/1984 | Gruhler | 33/558 |
| 4,498,241 A * | 2/1985 | Nakaoki | 33/832 |
| 4,845,855 A | 7/1989 | Meyer | 33/832 |
| 4,924,598 A * | 5/1990 | Gruhler | 33/832 |
| 5,040,308 A | 8/1991 | Meyer | 33/832 |
| 5,131,166 A * | 7/1992 | Weber | 33/832 |
| 5,373,645 A | 12/1994 | Bezinge et al. | 33/703 |
| 5,937,533 A | 8/1999 | Meyer et al. | 33/833 |
| 6,357,134 B1 * | 3/2002 | Hama et al. | 33/703 |

FOREIGN PATENT DOCUMENTS

JP 6-123602 5/1994

* cited by examiner

Primary Examiner—G. Bradley Bennett
(74) Attorney, Agent, or Firm—Oliff & Berridge, PLC

(57) ABSTRACT

In a switch (50), a dimension between the first contact pin (51) and a swing lever (52) and between the second contact pin (52) and the swing lever (53) is set 5 mm. Accordingly, a detection value of the displacement sensor can be captured when a relative displacement not less than 5 mm is caused between the first and the second sliders, in other words, when the impulse or vibration caused by a contact of a probe against a workpiece is stilled, so that stable measurement is possible. In other words, the dimension of the workpiece can be accurately measured without being influenced by the impulse or the vibration caused when the probe touches the workpiece.

17 Claims, 19 Drawing Sheets

F I G. 3
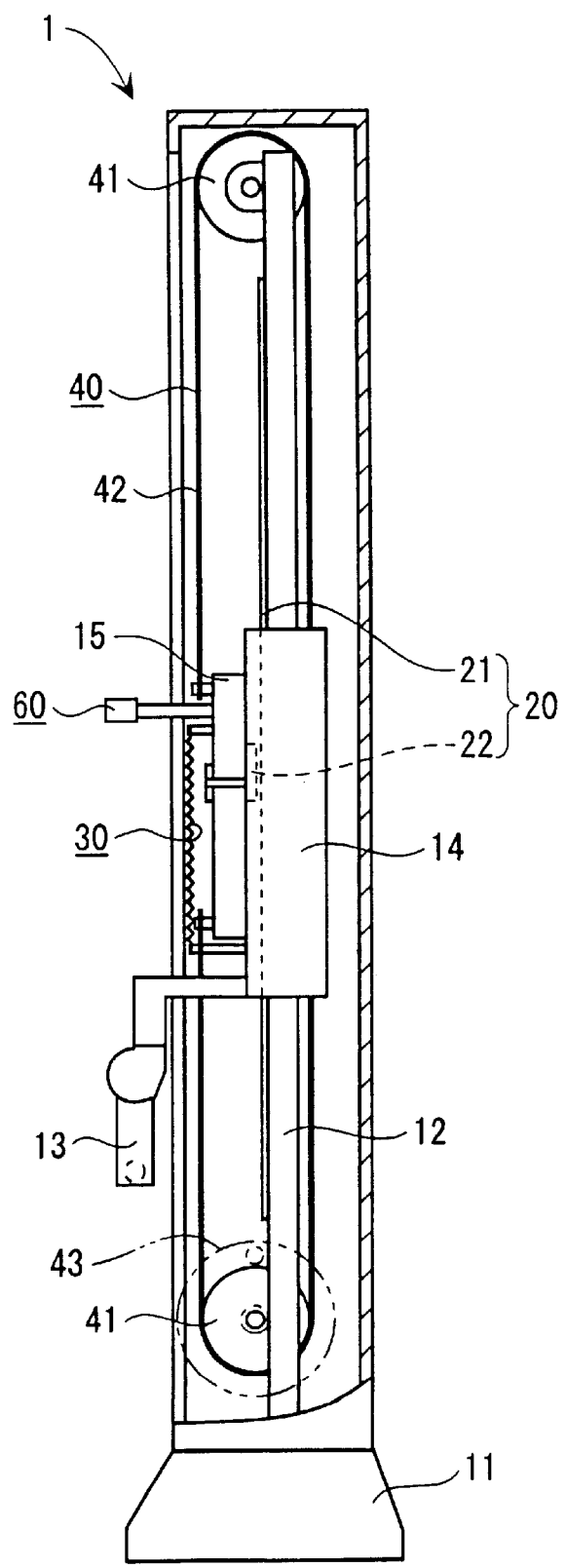

F I G. 6 (A)
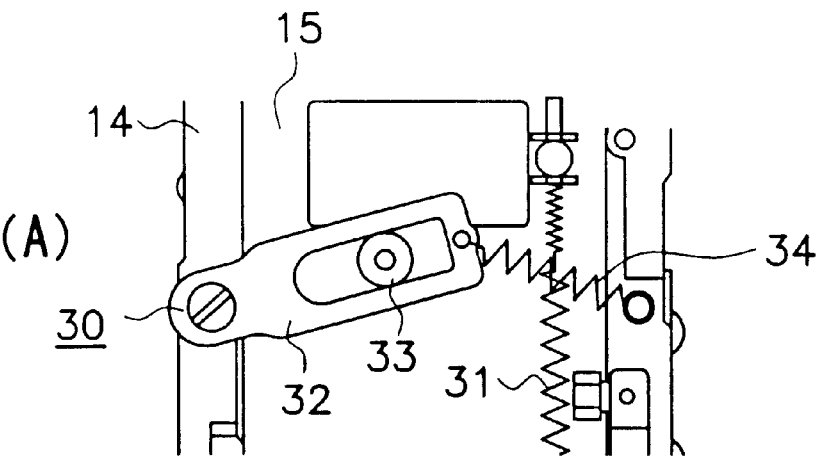
F I G. 6 (B)
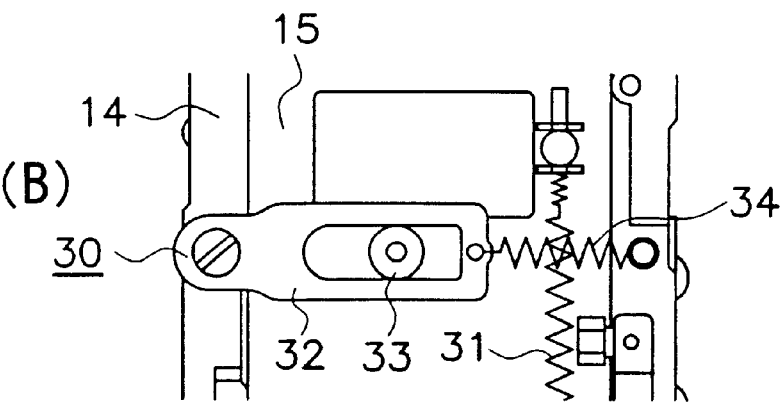
F I G. 6 (C)
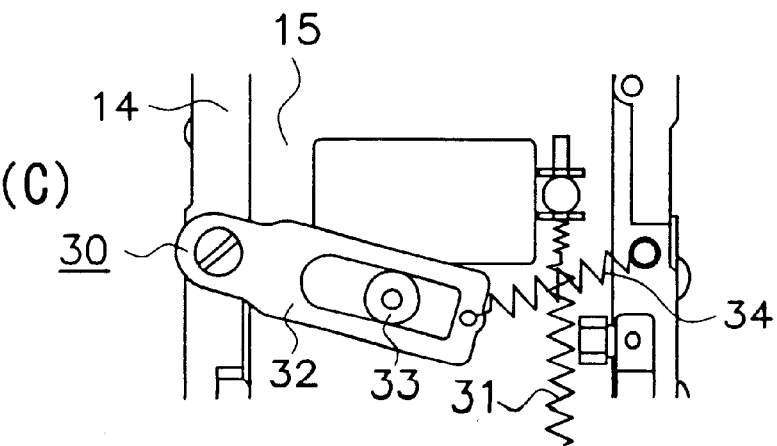

F I G. 7
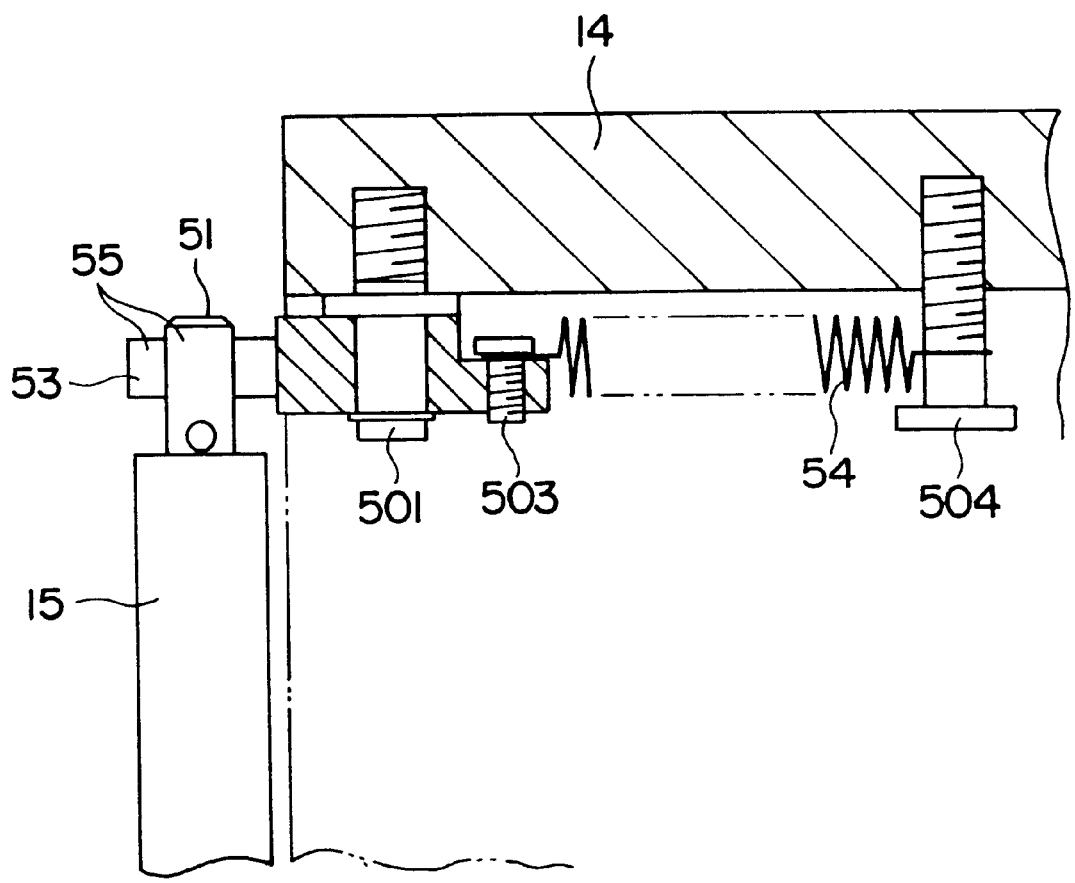

F I G . 9 (A)
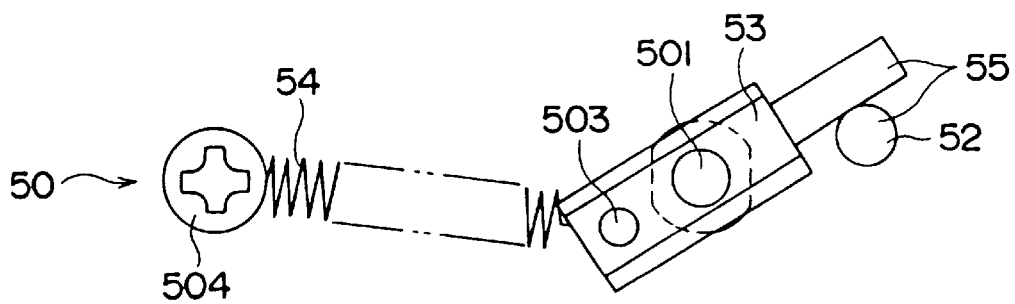
F I G . 9 (B)
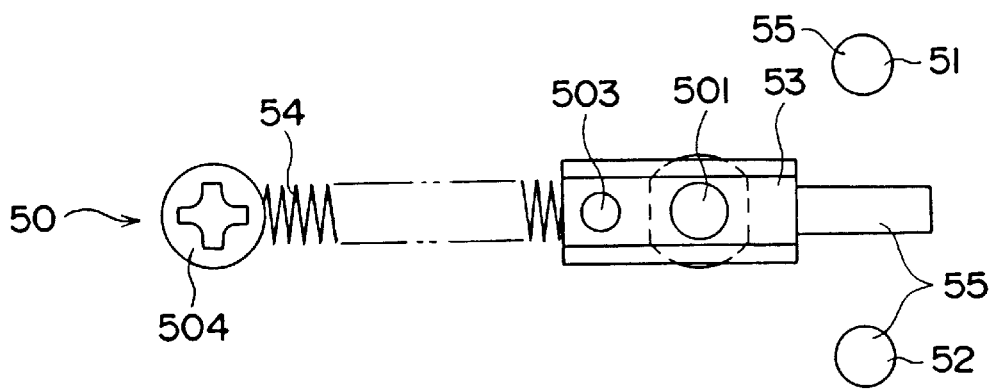
F I G . 9 (C)
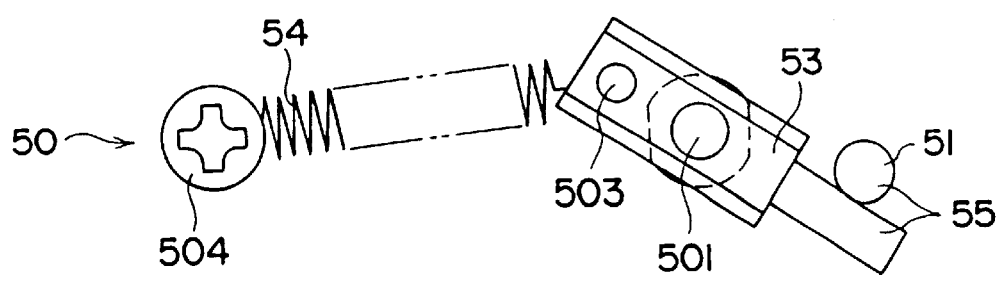
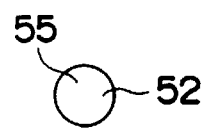

F I G. 14
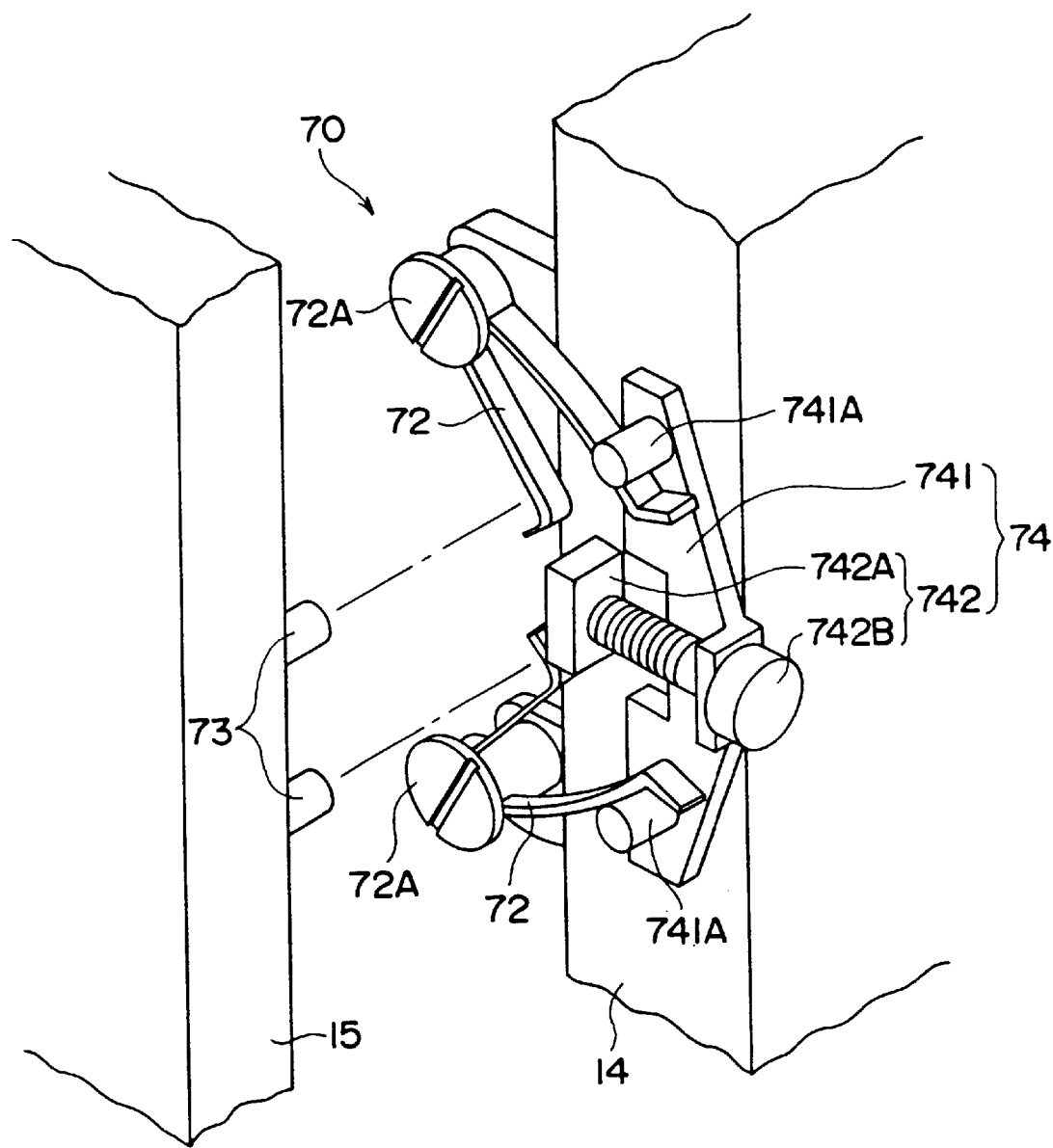

F I G. 15 (A)
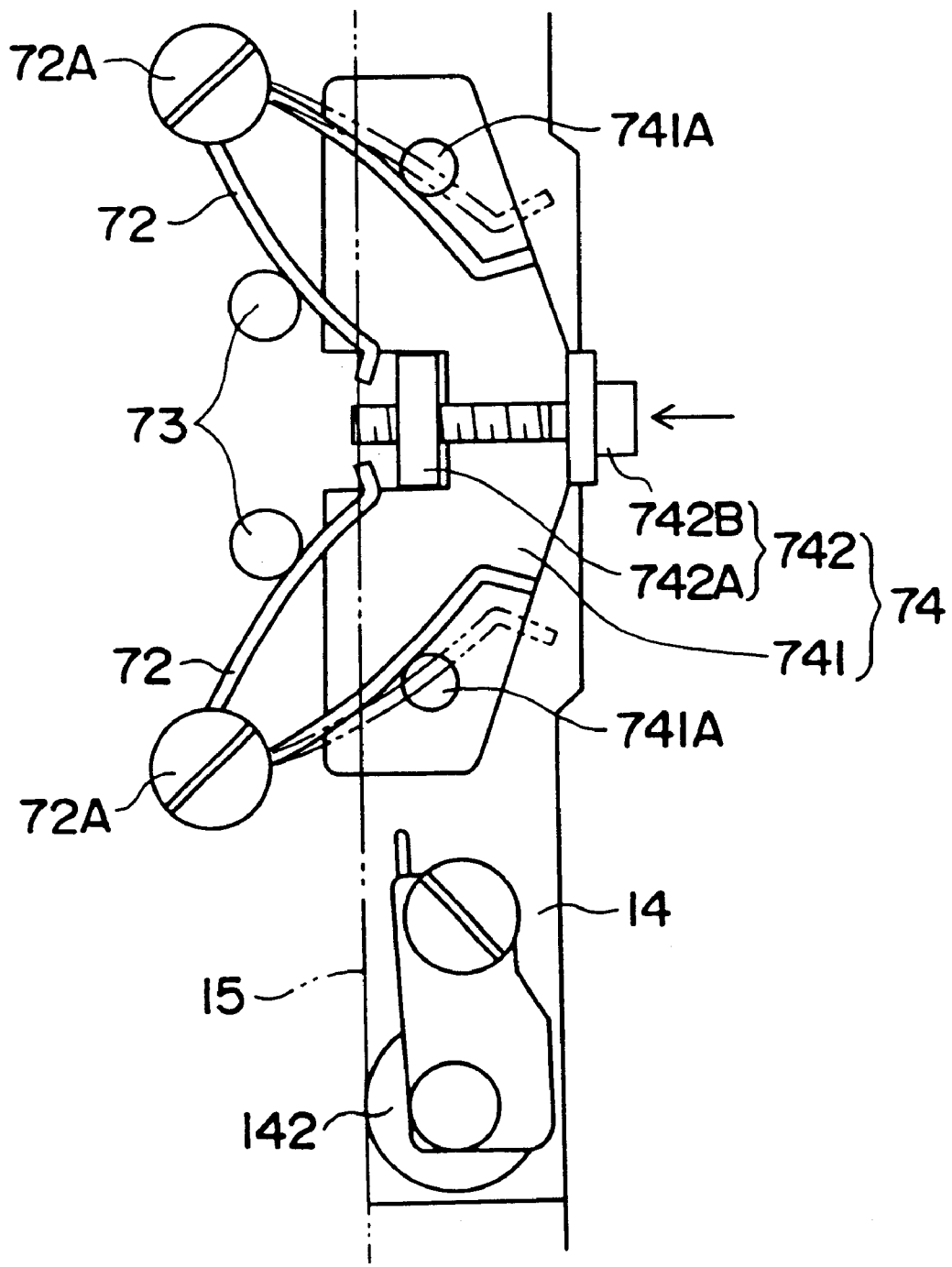

LINEAR MEASURING MACHINE

BACKGROUND OF THE INVENTION

1. Field of the Invention

The present invention relates to a linear measuring machine having a probe movable vertically, the probe being in contact with a target portion of a workpiece to measure a workpiece dimension such as height, level difference, hole and shaft.

2. Description of Related Art

Conventionally, a linear measuring machine having a probe movable vertically, the probe being in contact with a target portion of a workpiece to measure a workpiece dimension such as height, level difference, hole and shaft, has been known in, for example, a linear distance measuring machine disclosed in Japanese Patent Application Laid-Open Publication No. Hei 6-123602.

The linear measuring machine has a base, a column mounted on the base, a first slider vertically ascendable and descendable along the column and having a probe to be in contact with a workpiece, a displacement sensor for detecting a height position of the first slider, a second slider provided to the first slider movable in the same direction as a moving direction of the first slider, a constant-pressure mechanism for holding the first slider relative to the second slider, the constant-pressure mechanism relatively moving the second slider relative to the first slider when a more than predetermined load is applied between the sliders and returning the first slider and the second slider to a rest position when the load is released, a drive mechanism connected to the second slider for lifting and lowering the first and the second slider along the column upwardly and downwardly, and a switch actuated when the second slider moves relative to the first slider to capture a detection value of the displacement sensor.

In initiating measurement, the drive mechanism is actuated to lift and lower the first and the second slider vertically along the column. When the probe is in contact with the workpiece, since the first slider cannot move further, the second slider moves relative to the first slider. Then, the switch is actuated to capture the detection value of the displacement sensor. In other words, a height position of the first slider when the probe touches the workpiece is detected. Accordingly, the dimension of the workpiece can be measured by sequentially measuring a target portion of the workpiece.

[First Problem]

In the above-described measuring machine, since the detection value of the displacement sensor is captured by actuating the switch when the second slider moves relative to the first slider after the probe touches the workpiece, the detection value of the displacement sensor can be captured while impulse or vibration caused when the probe touches the workpiece is not stilled.

When the detection value is captured during the above condition, the detection value of the displacement sensor is unstable on account of influence of the impulse of the vibration, which can be observed as a measurement error.

[Second Problem]

As the switch of the measuring machine, an arrangement having a resistance band provided on the first slider along the moving direction thereof and a plate spring provided on the second slider with an end thereof sliding on the resistance band has been known, where the switch is actuated when a resistance value of the resistance band up to a position where the plate spring touches the resistance band reaches a predetermined value, thereby capturing the detection value of the displacement sensor.

However, since the plate spring slides on the resistance band according to the switch arrangement, the resistance value is likely to be fluctuated on account of the slide movement. In other words, such arrangement is likely to be influenced by age deterioration.

[Third Problem]

Since the constant-pressure mechanism of the aforesaid linear distance measuring machine is composed of three coil springs, more specifically, first extension coil spring for balancing weight of the first slider itself and two mutually parallel second extension coil springs opposing in motion for maintaining constant measuring pressure on both moving directions of the second slider, a space for disposing the coil springs in mutually parallel manner has to be secured in width direction of the slider. Further, since the extension coil spring requires considerable longitudinal space, the size of the slide portion can be increased.

Further, when two extension coil springs are used for maintaining the constant measuring pressure, extension coil springs are actuated when the second slider is lifted and when the second slider is lowered. Accordingly, since the measurement pressure when the second slider is lifted and the measurement pressure when the second slider is lowered become different if the spring pressures of the two extension coil springs are identical, so that the measuring pressure can be different according to measurement direction.

[Fourth Problem]

Since the constant-pressure mechanism of the aforesaid linear distance measuring machine is composed of three coil springs, more specifically, first extension coil spring for balancing weight of the first slider itself and two mutually parallel second extension coil springs opposing in motion for maintaining constant measuring pressure on both moving directions of the second slider, the first slider having the probe is likely to move along the column when an outside force is applied to the probe. Therefore, it is difficult to conduct marking-off work with the conventional linear distance-measuring machine.

Further, when impulse or vibration is applied during transportation, the first slider moves along the column, so that the three coil springs can be excessively stretched.

SUMMARY OF THE INVENTION

[First Aspect]

For solving the aforesaid first problem, first aspect of the present invention includes following arrangement including: a base; a column mounted on the base; a first slider movable vertically along the column and having a probe to be in contact with a workpiece; a displacement sensor for detecting height position of the first slider; a second slider provided on the first slider, the second slider being movable in the same direction as a moving direction of the first slider; a constant-pressure mechanism for holding the first slider against the second slider, the constant-pressure mechanism moving the second slider relative to the first slider when a more than predetermined load is applied between the sliders and returning the first slider and the second slider to a rest position when the load is released; a drive mechanism connected to the second slider for vertically moving the second slider along the column; and a switch being actuated when the second slider moves relative to the first slider to capture a detection value of the displacement sensor, the linear measuring machine being characterized in that an allowable relative movement amount of the first slider and the second slider is not less than 3 mm, and that the switch is actuated to capture the detection value of the displacement sensor when the first slider and the second slider relatively move not less than 3 mm.

According to the above arrangement, when the second slider is vertically lifted and lowered along the column, lowered for instance, the first slider is also lowered together in the same direction by the constant-pressure mechanism. Then, when the second slider is further lowered after the probe touches the workpiece, since the first slider cannot be further lowered, the second slider is moved (lowered) relative to the first slider by the constant-pressure mechanism when the more than predetermined load is applied between the first and the second sliders. When the relative movement amount is not less than 3 mm, the switch is actuated to capture the detection value of the displacement sensor. In other words, the height dimension of the measurement surface of the workpiece in contact with the probe is measured (basic movement).

Accordingly, since the detection value of the displacement sensor is captured when the second slider is moved relative to the first slider for not less than 3 mm, the impulse or the vibration caused when the probe touches the workpiece is stilled, thus enabling stable measurement. In other words, the dimension of the workpiece can be accurately measured without being influenced by the impulse or the vibration when the probe touches the workpiece.

In the first aspect of the present invention, the allowable relative movement amount of the first slider and the second slider may preferably be not less than 3 mm, where, during ordinary measurement, the switch may preferably be actuated when the first slider and the second slider relatively move not less than 3 mm to capture the detection value of the displacement sensor, and where, during profiling measurement, the switch may preferably be actuated when the first slider and the second slider relatively move not less than 3 mm to capture the detection value of the displacement sensor, and, thereafter, the detection value of the displacement sensor may preferably be captured at a predetermined time interval.

In the above arrangement, the workpiece is measured according to the same function as described thus far during normal measurement.

On the other hand, during profiling measurement, the workpiece is measured as follows. For instance, during profiling measurement of the inner circumference of a hole of the workpiece, the second slider is vertically moved, lowered for instance, along the column, so that the first slider is lowered together in the same direction through the constant-pressure mechanism. Then, after the probe touch the inner wall of the hole of the workpiece, the second slider is further lowered. Since the first slider cannot be further lowered, the second slider is moved (lowered) relative to the first slider by the constant-pressure mechanism when a more than predetermined load is applied between the first and the second sliders. When the relative movement becomes not less than 3 mm, the switch is actuated to capture the detection value of the displacement sensor.

Since the second slider is lowered for not less than 3 mm relative to the first slider under the above state, downward force is applied to the first slider and the probe by the constant-pressure mechanism. Accordingly, when the workpiece or the linear measuring machine is horizontally moved under the above state, the detection value of the displacement sensor is captured at a predetermined time interval. In other words, since the detection value of the displacement sensor can be captured at the predetermined time interval while the probe relatively moves keeping in contact with and profiling the inner wall of the hole, the value of the lowermost end of the hole can be obtained by calculating the minimum value of the captured detection value.

In the first aspect of the present invention, the switch may preferably further include: a first contact pin and a second contact pin on either one of the first and the second sliders mutually spaced apart along a moving direction of the sliders; a swing lever swingably supported by the other one of the first and the second sliders, a part of the swing lever remote from a swing support point thereof being located at the center of the first contact pin and the second contact pin; and a biasing means for retaining the swing lever at a rest condition and for allowing a swing movement of the swing lever during relative movement of the first and the second sliders, the gap between the swing lever and the first contact pin and the gap between the swing lever and the second contact pin being not less than 3 mm at the rest position of the swing lever.

According to the above arrangement, when the second slider is moved (lowered) relative to the first slider after the probe touches the workpiece, the swing lever and the first or the second contact pin touch with each other when the relative movement amount becomes not less than 3 mm. Then, the detection value of the displacement sensor at the time is captured. In other words, the height dimension of the measurement surface of the workpiece in contact with the probe can be measured.

When the second slider is further moved (lowered) relative to the first slider, since the swing lever is swung while being in contact with the first or the second contact pin, the damage and failure of the swing lever and the first and the second contact pins can be prevented, which also contribute to protection of the probe.

After measurement, when the second slider is lifted along the column by the drive mechanism, the swing lever is separated from the first or the second contact pin while being gradually returning to the rest position by virtue of the biasing means. When the second slider is further lifted, the first slider and the second slider return to the rest position while gradually releasing the load applied between the first and the second sliders. In other words, the second slider returns to the rest position of the first slider.

Accordingly, since the first and the second contact pin and the swing lever constituting the switch only temporarily touch with other during measurement accompanying relative movement of the first and the second sliders, the influence of age deterioration can be substantially decreased as compared to the arrangement for detecting the relative movement of the sliders with a plate spring sliding on a resistance band. Further, since the switch can be composed of the first and the second contact pins, the swing lever and the biasing means, the relative displacement of both of the sliders can be securely detected with a simple arrangement.

In the above first aspect of the present invention, the biasing means may preferably include a single extension coil spring.

According to the above arrangement, since the biasing means is composed of a single extension coil spring, the biasing means can be constructed extremely inexpensively and construction thereof can be facilitated. Further, since the reaction force in swinging the swing lever after the swing lever is in contact with the first or the second contact pin can be adjusted by selecting spring force of the extension coil spring, an appropriate braking function can be endowed in lifting and lowering the second slider.

[Second Aspect]

For solving the aforesaid second problem, second aspect of the present invention has the following arrangement including: a base; a column mounted on the base; a first slider movable vertically along the column and having a probe to be in contact with a workpiece; a displacement sensor for detecting height position of the first slider; a second slider provided to the first slider, the second slider being movable in the same direction as a moving direction of the first slider; a constant-pressure mechanism for holding the first slider against the second slider, the constant-pressure mechanism moving the second slider relative to the first slider when a more than predetermined load is applied between the sliders and returning the first slider and the second slider to an initial position when the load is released; a drive mechanism connected to the second slider for vertically moving the second slider along the column; and a switch being actuated when the second slider moves relative to the first slider to capture a detection value of the displacement sensor; the switch further including: a first contact pin and a second contact pin on either one of the first and the second sliders mutually spaced apart along a moving direction of the slider; a swing lever swingably supported on the other one of the first and the second sliders, a part of the swing lever remote from a swing support point thereof being located at the center of the first contact pin and the second contact pin; and a biasing means for retaining the swing lever at a rest condition and for allowing a swing movement of the swing lever during relative movement of the first and the second sliders.

According to the above arrangement, the height dimension of the measurement surface in contact with the probe can be measured according to the basic movement described in the above first aspect of the present invention.

Further, when the second slider is further moved (lowered) relative to the first slider, since the swing lever is swung while being in contact with the first or the second contact pin, the damage and failure of the swing lever and the first and the second contact pins can be prevented, which also contribute to protection of the probe.

After measurement, when the second slider is lifted along the column by the drive mechanism, the swing lever is separated from the first or the second contact pin while gradually returning to the rest condition by virtue of the biasing means. When the second slider is further lifted, the first and the second sliders returns to the rest position while gradually releasing the load applied between the first and the second sliders. In other words, the second slider returns to the rest position of the first slider.

Accordingly, since the first and the second contact pin and the swing lever constituting the switch only temporarily touch with other during measurement accompanying relative movement of the first and the second sliders, the influence of age deterioration can be substantially decreased as compared to the arrangement for detecting the relative movement of the sliders with a plate spring sliding on a resistance band. Further, since the switch can be composed of the first and the second contact pins, the swing lever and the biasing means, the relative displacement of both of the sliders can be securely detected with a simple arrangement.

In the above second aspect of the present invention, a switching portion may preferably be formed between the first contact pin and the swing lever and between the second contact pin and the swing lever.

According to the above arrangement, since the switching portion is directly formed between the first contact pin and the swing lever and between the second contact pin and the swing lever, a separate switch is not necessary, thus reducing the number of parts and production cost.

In the above second aspect of the present invention, an intermediate portion of the swing lever may preferably be swingably supported by the other one of the first and the second sliders and one end of the swing lever may preferably be located at the center of the first contact pin and the second contact pin at the rest condition, and the biasing means may preferably include a single extension coil spring for stretching the other end of the swing lever perpendicularly relative to a straight line connecting the first contact pin and the second contact pin.

According to the above arrangement, since the biasing means is composed of a single extension coil spring, the biasing means can be constructed extremely inexpensively and construction thereof can be facilitated. Further, since the reaction force in swinging the swing lever after the swing lever is in contact with the first or the second contact pin can be adjusted by selecting spring force of the extension coil spring, an appropriate braking function can be endowed in lifting and lowering the second slider.

[Third Aspect]

For solving the aforesaid third problem, third aspect of the present invention has the following arrangement, including: a base; a column mounted on the base; a first slider movable vertically along the column and having a probe to be in contact with a workpiece; a displacement sensor for detecting height position of the first slider; a second slider provided to the first slider, the second slider being movable in the same direction as a moving direction of the first slider; a constant-pressure mechanism for holding the first slider against the second slider, the constant-pressure mechanism moving the second slider relative to the first slider when a more than predetermined load ;is applied between the sliders and returning the first slider and the second slider to an initial position when the load is released; a drive mechanism connected to the second slider for vertically moving the second slider along the column; and a switch being actuated when the second slider moves relative to the first slider to capture a detection value of the displacement sensor; the constant-pressure mechanism further comprising: a weight-balancing biasing means provided between the first slider and the second slider to bias the first slider upwardly with a force equal to a total weight of the first slider and a component attached to the first slider; a cam member provided to the first slider swingably in up and down direction and having a longitudinally-extending slide groove; an engage pin provided to the second slider to slidably engage the slide groove of the cam member; and a constant-pressure biasing means for allowing swing movement of the cam member when a more than predetermined force is applied between the first and the second slider in a relative movement direction thereof.

According to the above arrangement, the height dimension of the measurement surface of the workpiece in contact with the probe can be measured according to basic movement described in the first aspect of the present invention.

At this time, when a more than predetermined force is applied between the first and the second sliders in relative movement direction thereof, the cam member is swung against the constant-pressure biasing means and the second slider is moved relative to the first slider.

In other words, when the second slider is lowered relative to the first slider, since measurement pressure stays constant by the constant-pressure biasing means, the measurement pressure can be maintained constant irrespective of difference among individuals.

On the other hand, when the second slider is lifted by the drive mechanism, since only the cam member is swung upwardly against the constant-pressure biasing means, the measurement pressure in lifting the second slider and the measurement pressure in lowering the second slider can be made identical. In other words, the measurement pressure does not differ irrespective of measurement direction.

Incidentally, when the second slider is lifted along the column by the drive mechanism after measurement, the cam member gradually returns to the horizontal rest position.

Since the constant-pressure mechanism for conducting the above function is composed of the weight-balancing biasing means, a cam member, an engage pin and a constant-pressure biasing means, the size thereof can be reduced as compared to a conventional arrangement having parallel three extension coil springs extending along predetermined length.

Further, since the second slider is biased by the constant-pressure biasing means in being lifted and lowered, the measurement pressure in lifting the second slider and the measurement pressure in lowering the second pressure can be made identical.

In the above third aspect of the present invention, one end of the cam member may preferably be swingably supported by the first slider and the other end of the cam member may preferably be horizontally biased by the constant-pressure biasing means sandwiching the engage pin.

According to the above arrangement, since the tensile force is applied to the other end of the cam member with the one end of the cam member being the swing support point sandwiching the engage pin, returnability into the rest position can be highly maintained.

A linear measuring machine according to third aspect of the present invention may preferably include: a base; a column mounted on the base; a first slider movable vertically along the column and having a probe to be in contact with a workpiece; a displacement sensor for detecting height position of the first slider; a second slider provided to the first slider, the second slider being movable in the same direction as a moving direction of the first slider; a constant-pressure mechanism for holding the first slider against the second slider, the constant-pressure mechanism moving the second slider relative to the first slider when a more than predetermined load is applied between the sliders and returning the first slider and the second slider to an initial position when the load is released; a drive mechanism connected to the second slider for vertically moving the second slider along the column; and a switch being actuated when the second slider moves relative to the first slider to capture a detection value of the displacement sensor; the constant-pressure mechanism further comprising: a weight-balancing biasing means provided between the first slider and the second slider to bias the first slider upwardly with a force equal to a total weight of the first slider and a component attached to the first slider; a pair of plate spring disposed on either one of the first and the second sliders elastically deformable in a relative movement direction of the first and the second sliders; and a pair of press pin in contact with an elastically deformable portion of the respective plate springs, the pair of press pin being disposed on the other one of the first and the second sliders.

According to the above arrangement, the height dimension of the measurement surface of the workpiece in contact with the probe can be measured according to the basic movement described in the first aspect of the present invention.

At this time, as described above, since the measurement pressure stays constant on account of the constant-pressure biasing means in the constant-pressure mechanism, the measurement pressure can be maintained constant irrespective of difference among individuals and deviation in the measurement pressure can be reduced irrespective of measurement direction.

Further, since the constant-pressure mechanism is composed of the weight-balancing biasing means, the pair of plate spring, and the pair of press pin, the size of the constant-pressure mechanism can be reduced as compared to the arrangement having parallel three extension coil springs extending along predetermined length.

In the above third aspect of the present invention, the linear measuring machine may preferably include a single spring pressure adjustment means for simultaneously adjusting a spring pressure of the pair of the plate spring.

According to the above arrangement, since the spring pressure of the pair of plate spring can be simultaneously adjusted by the single spring pressure adjustment means, the adjustment work can be facilitated and the adjustment means can be economically constructed.

In the third aspect of the present invention, the linear measuring machine may preferably include two spring pressure adjustment means for independently adjusting the spring pressure of the pair of plate spring.

According to the above arrangement, since the spring pressure of the pair of plate spring can be simultaneously adjusted, the pressure can be easily corrected when, for instance, the measurement pressure in lifting the second slider and the measurement pressure in lowering the second slider differ.

[Fourth Aspect]

For solving the above fourth problem, fourth aspect of the present invention includes following arrangement.

A linear measuring machine according to fourth aspect of the present invention includes: a base; a column mounted on the base; a first slider movable vertically along the column and having a probe to be in contact with a workpiece; a displacement sensor for detecting height position of the first slider; a second slider provided to the first slider, the second slider being movable in the same direction as a moving direction of the first slider; a constant-pressure mechanism for holding the first slider against the second slider, the constant-pressure mechanism moving the second slider relative to the first slider when a more than predetermined load is applied between the sliders and returning the first slider and the second slider to an initial position when the load is released; a drive mechanism connected to the second slider for vertically moving the second slider along the column; a switch being actuated when the second slider moves relative to the first slider to capture a detection value of the displacement sensor; and a clamp mechanism for combining the first slider and the second slider.

According to the above arrangement, since the first slider and the second slider can be combined by the clamp mechanism, the position of the probe provided on the first slider can be fixed by combining the first slider and the second slider after fixing the second slider by fixing the drive mechanism. Accordingly, for instance, marking-off work can be conducted by exchanging the probe with a scriber etc. and horizontally moving the workpiece and/or the linear measuring machine while pressing the scriber onto the workpiece.

Further, during transportation, relative movement between the first and the second sliders can be prevented by combining the first slider and the second slider, so that trouble toward the constant-pressure mechanism interposed therebetween can be substantially reduced.

In the above fourth aspect of the present invention, the clamp mechanism may preferably include a through-hole provided on the second slider, an engage hole provided on the first slider correspondingly to the through-hole, and a clamp pin passing through the through-hole to engage the engage hole.

According to the above arrangement, since the first slider and the second slider can be combined by inserting the clamp pin into the through-hole of the second slider to engage with the engage hole of the first slider, an object of the present invention can be attained with a simply-structured clamp mechanism.

In the above fourth aspect of the present invention, the clamp mechanism may preferably further include a through-hole provided on the second slider, an engage hole provided on the first slider correspondingly to the through-hole, a clamp pin passing through the through-hole to engage the engage hole, and a clamp pin advance retainer for holding the clamp pin to the through-hole on the second slider and for advancing the clamp pin toward the engage hole when the clamp pin is rotated by a predetermined angle.

According to the above arrangement, since the clamp pin can be advanced toward and engaged with the engage hole of the first slider only by rotating for a predetermined angle after being retained in the through-hole on the second slider, the clamp pin can be easily secured to the first and the second sliders with shorter time as compared to an arrangement where, for instance, a screw hole is cut in the second slider and the clamp pin is screwed thereto for advancing the clamp pin toward the engage hole. Further, the clamp pin can be prevented from being fallen off from the first and the second sliders during marking-off work or transportation on account of the clamp pin advance retainer.

In the above fourth aspect of the present invention, the clamp pin advance retainer may preferably include: a positioning pin projecting perpendicularly from the clamp pin; a guide cylinder provided adjacent to the through-hole of the second slider and having a groove for the positioning pin to be engaged; and a biasing means for biasing the clamp pin in a direction for the clamp pin to advance toward the engage hole.

According to the above arrangement, since the clamp pin can be advanced with the positioning pin running along the groove of the guide cylinder, the clamp pin can be advanced along a central axis of the through-hole and the engage hole and toward the engage hole, so that the distal end of the clamp pin can be easily engaged with the engage hole.

In the above fourth aspect of the present invention, the distal end of the clamp pin may preferably be formed in tapered shape.

According to the above arrangement, since the distal end of the clamp pin is formed in tapered shape, even when mutual position between the central axis of the clamp pin inserted to the through-hole of the second slider and the center of the engage hole of the first slider is slightly shifted, the clamp pin can be securely inserted to the engage hole of the first slider.

BRIEF DESCRIPTION OF THE DRAWINGS

FIG. 3 is a cross section taken along III—III line in FIG. 1;

FIGS. 6(A), 6(B) and 6(C) are plan views respectively showing a function of a constant-pressure mechanism of the aforesaid embodiment;

FIG. 7 is an enlarged cross section showing a switch of the aforesaid embodiment;

FIGS. 9(A), 9(B) and 9(C) are plan views respectively showing a function of the switch of FIG. 7;

FIG. 14 is an enlarged exploded perspective view of the modification shown in FIG. 13;

DETAILED DESCRIPTION OF PREFERRED EMBODIMENT(S)

An embodiment of the present invention will be described below with reference to attached drawings.
[Entire Arrangement]

Figure 1:
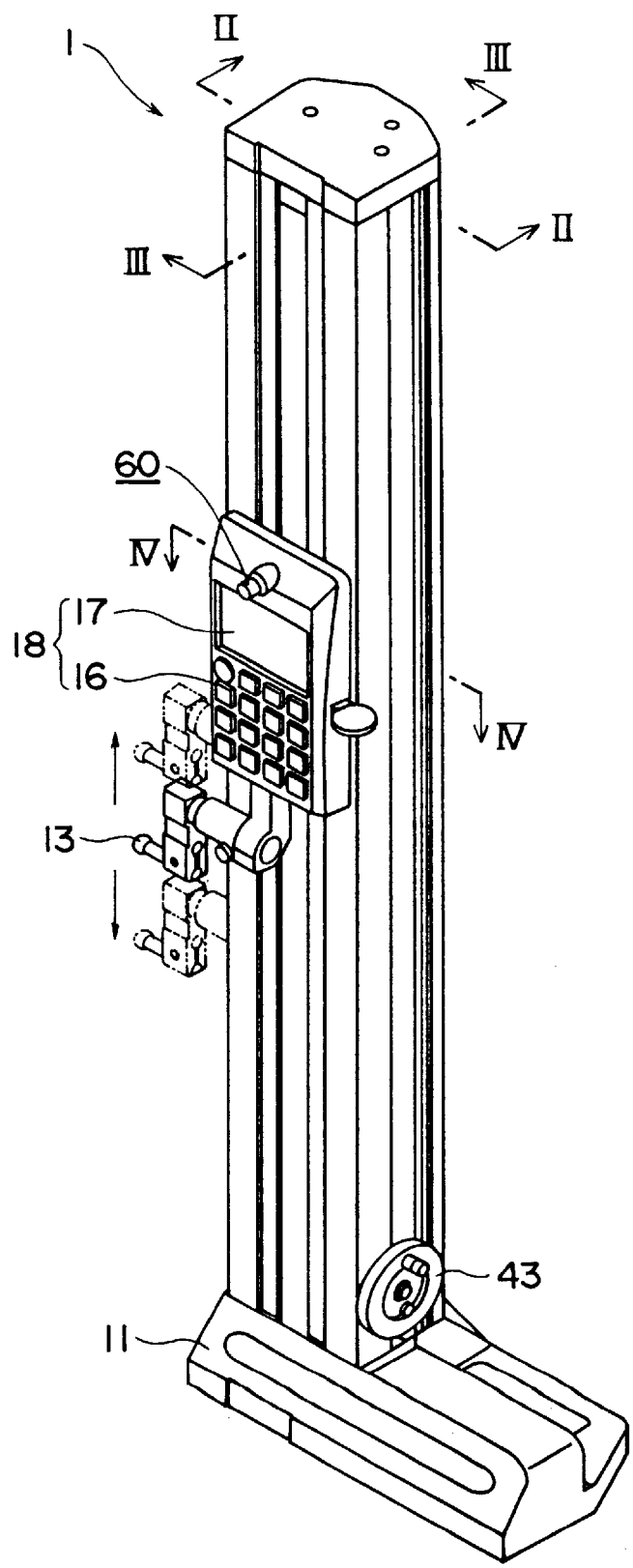
FIG. 1 is a perspective view showing an embodiment of a linear measuring machine according to the present invention.
Figure 2:
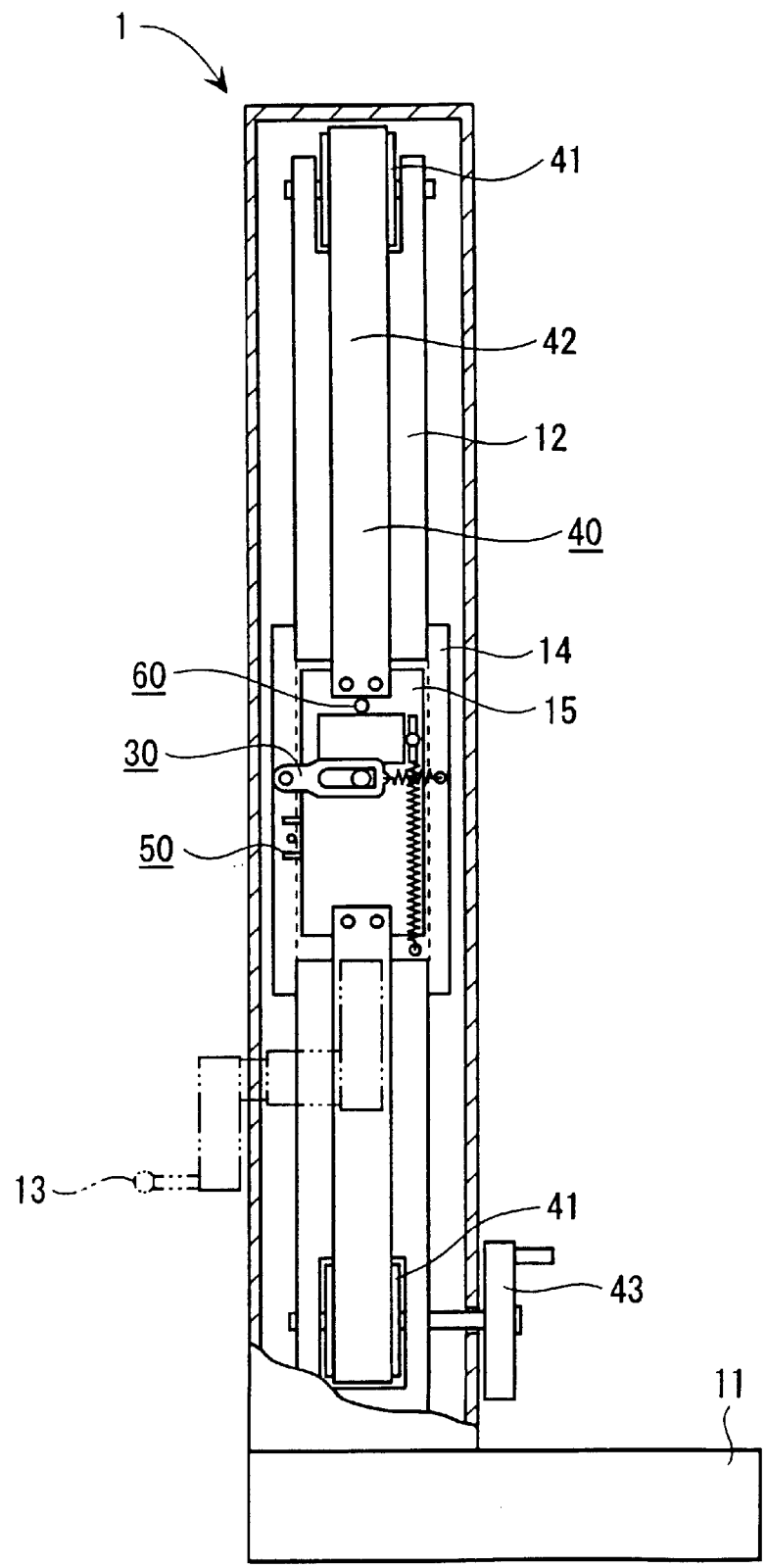
FIG. 2 is a cross section taken along II—II line in FIG. 1.
Figure 4:
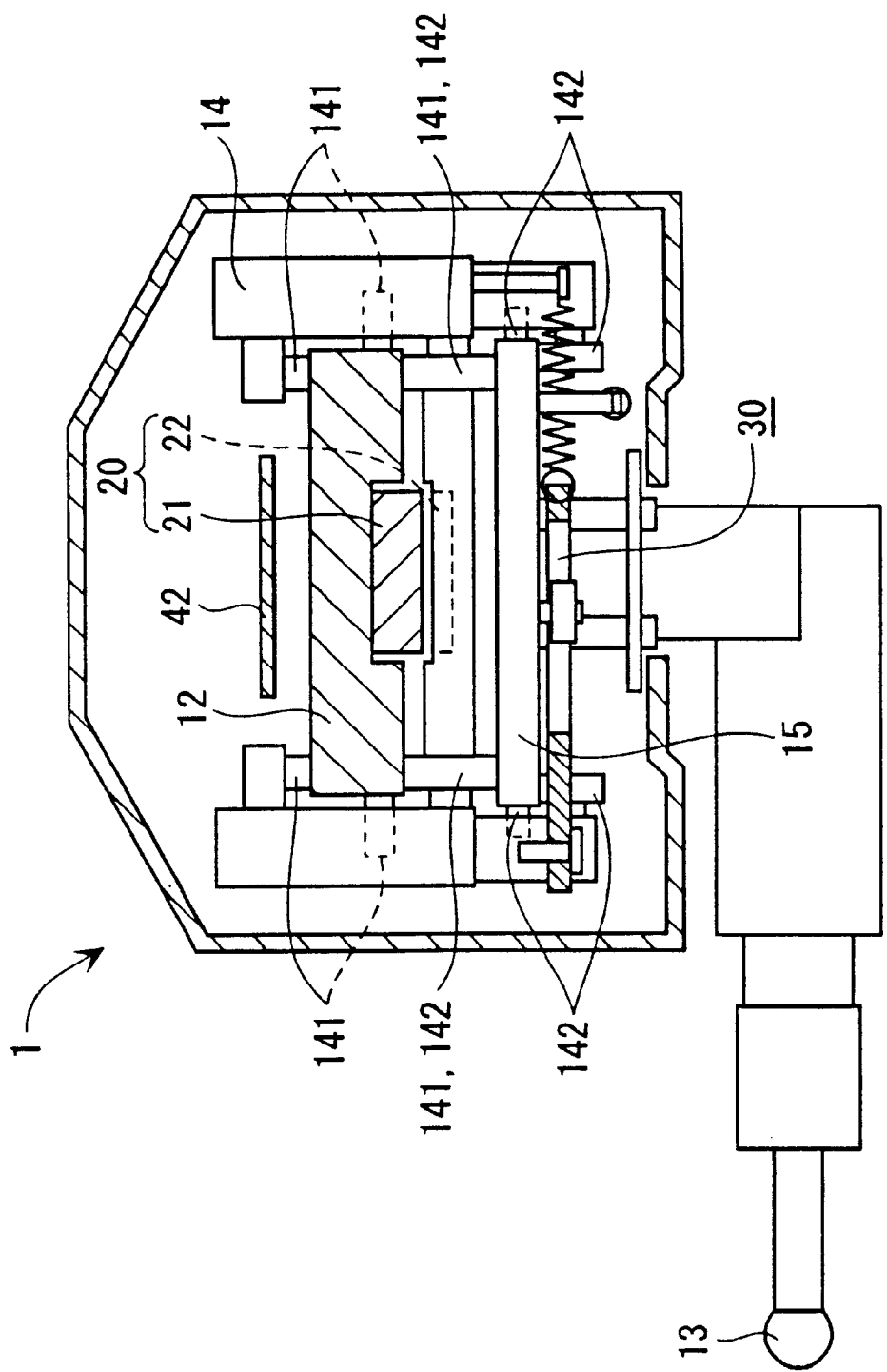
FIG. 4 is a cross section taken along IV—IV line in FIG. 1.

FIG. 1 is a perspective view showing an embodiment of a linear measuring machine according to the present invention and FIGS. 2, 3 and 4 are cross sections respectively taken along II—II line, III—III line and IV—IV line in FIG. 1;

A linear measuring machine 1 has a base 11, a column mounted on the base 11, a first slider 14 provided vertically movable along the column 12 and having a probe 13 on a lower portion thereof, a displacement sensor for detecting height position of the first slider 14, a second slider 15 for vertically moving the first slider 14, a constant-pressure mechanism provided between the first and the second sliders 14 and 15, a drive mechanism 40 connected to the second slider 15 to vertically move the second slider 15 along the column 12, a switch 50 to be actuated when the second slider 15 relatively moves against the first slider 14 to capture the detection value of the displacement sensor 20, a clamp mechanism 60 for combining the first slider 14 and the second slider 15, and a display console 18 provided on a front side of the second slider 15 and having a display 16 such as LCD constituting a display means and a key input portion provided on one side thereof.
[First Slider 14]

In FIG. 4, the first slider 14 is formed in approximately C-shape, where a plurality of bearing 141 provided on the first slider 14 touches respective sides of the column 12 so that the first slider 14 is slidably fitted to the column 12 vertically therealong.
[Second Slider 15]

Figure 5:
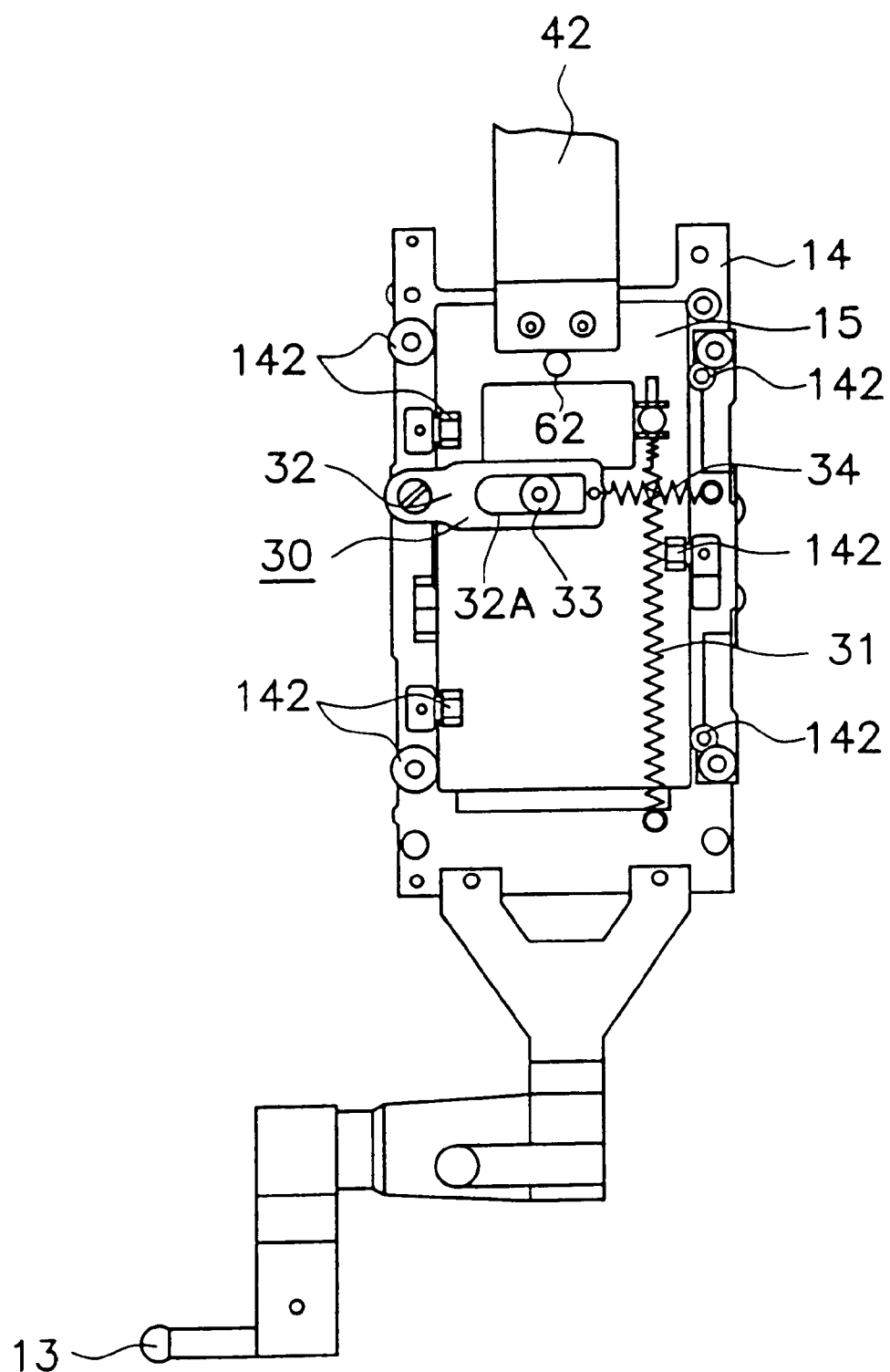
FIG. 5 is a plan view showing primary portion of the aforesaid embodiment.

In FIG. 4 and FIG. 5, the second slider 15 is formed in flat rectangular shape, where a plurality of bearing 142 provided on the first slider 14 touches respective sides of the second slider 15 so that the second slider 15 is attached to the first slider 14 along up and down direction of the column 12. In other words, the second slider 15 is attached to the first slider 14 to be slidable in the same direction as a moving direction of the first slider 14.

[Displacement Sensor 20]

In FIG. 3 and FIG. 4, the displacement sensor 20 has a scale 21 provided along the column 12 and having an optical grid thereon, and a sensor 22 provided on the first slider 14 opposing the scale 21, both the scale 21 and the sensor 22 cooperated to detect a height displacement of the first slider 14 on the column 12 as an electric signal.

[Constant-Pressure Mechanism]

In FIG. 5, the constant-pressure mechanism 30 is composed of an extension spring 31 as a weight-balancing biasing means for upwardly biasing the first slider 14 with a force equal to total weight of the first slider 14 and components attached thereto, a cam member 32 with one end thereof swingable on the first slider 14 and provided with a slide groove 32A along longitudinal direction thereof, an engage pin 33 provided on the second slider 15 to slidably engage to the slide groove 32A, an extension spring 34 as a constant-pressure biasing means for retaining the cam member 32 at a rest position and for allowing swing movement of the cam member 32 when more than predetermined force is applied between the first and the second sliders 14 and 15.

An upper end and a lower end of the extension spring 31 are connected to an upper part of the second slider 15 and a lower part of the first slider 14 respectively. Accordingly, the first slider 14 is supported by the second slider 15 through the extension spring 31.

One end of the extension spring 34 engages the other end of the cam member 32 and the other end of the extension spring 34 engages the first slider 14 respectively. Accordingly, the cam member 32 is biased by the extension spring 34 constantly in horizontal direction.

When more than predetermined load is not applied between the first and the second sliders 14 and 15 (referred to rest condition hereinafter), the extension spring 31 is not stretched as shown in FIG. 6(b), so that relative movement does not occur therebetween and the cam member 32 keeps the horizontal rest position. Therefore, when the second slider 15 is vertically moved, the first slider 14 is vertically moved together in the same direction.

When the first and the second sliders 14 and 15 are moved downwardly and, for instance, after the lower portion of the probe 13 of the first slider 14 touches the workpiece (not shown), the second slider 15 is lowered, since the first slider 14 cannot be further lowered, more than predetermined load is applied between the first and the second sliders 14 and 15. Then, the extension spring 31 is stretched, thus causing relative movement between the first slider 14 and the second slider 15. The engage pin 33 of the second slider 15 slidably moves downwardly along the slide groove 32A of the cam member 32 of the first slider 14, so that the cam member 32 is swingably moved downwardly against the extension spring 34 (see FIG. 6(c)).

On the contrary, when the first and the second sliders 14 and 15 are moved upwardly and, after the upper portion of the probe 13 of the first slider 14 touches the workpiece, the second slider 15 is lifted further, the cam member 32 is swingably moved against the extension spring 34 (see FIG. 6(a)).

When the more than predetermined load is released from between the first and second sliders 14 and 15, the cam member 32 is urged by the extension spring 34 in horizontal direction to return the cam member 32 to the rest position (see FIG. 6(b)), thus canceling the relative movement between the first and the second sliders 14 and 15. In other words, the first slider 14 and the second slider 15 are returned to initial position thereof.

[Drive Mechanism 40]

In FIGS. 2 and 3, the drive mechanism 40 is composed of two pulleys 41 rotatable at upper and lower ends of the column 2, a band-shaped belt 42 wound therearound along rotation direction of the pulleys 41, and a handle 43 provided to a shaft of the lower pulley 41 of the column 12.

One end of the belt 42 is connected to the upper end of the second slider 15 and the other end is connected to the lower end of the second slider 15 respectively, so that the second slider 15 is vertically moved along the column 12 by rotating the handle 43.

[Switch 50]

Figure 8:
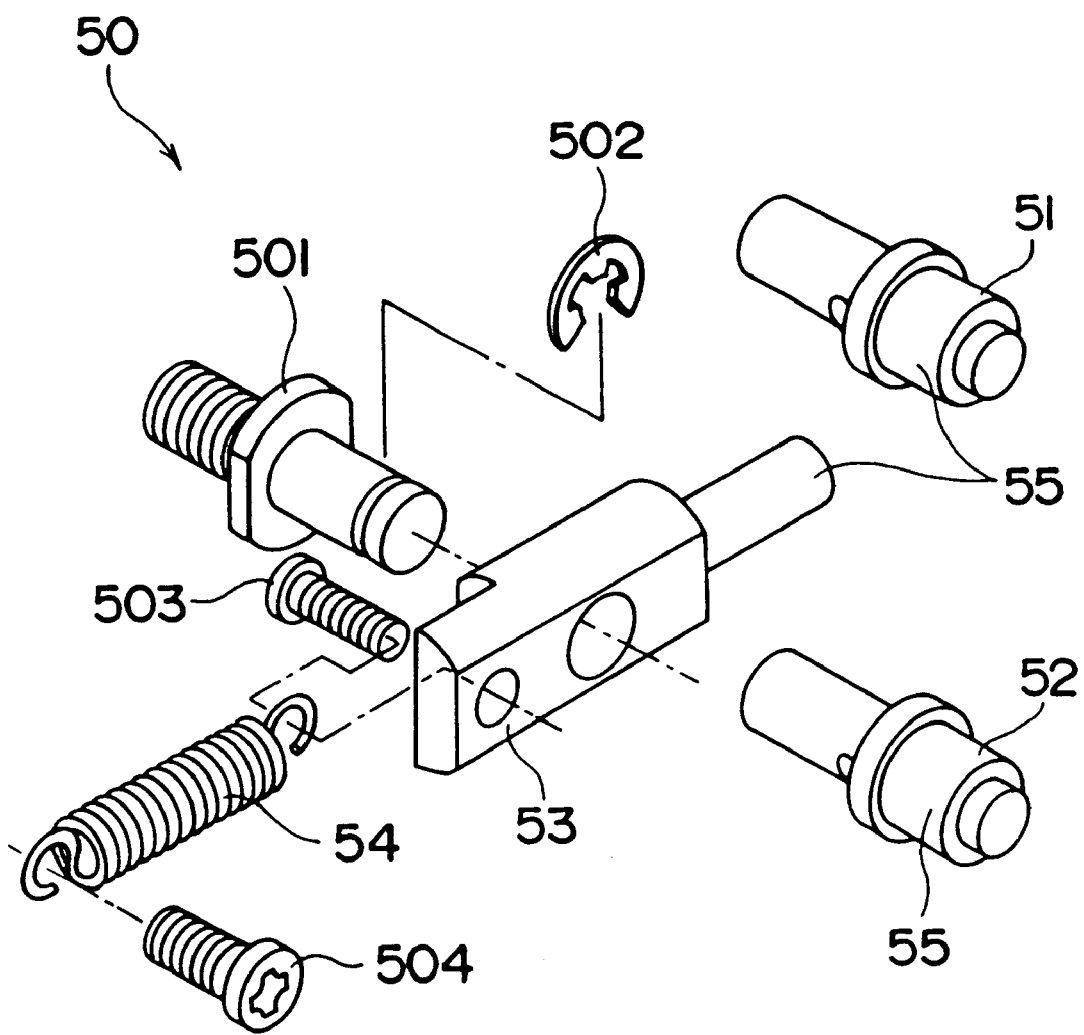
FIG. 8 is an exploded perspective view showing the switch of FIG. 7.

In FIGS. 7 and 8, the switch 50 is composed of a first contact pin 51 and a second contact pin 52 fixed to a side of the second slider 15 vertically spaced apart, a swing lever 53 provided swingably to the first slider 14, and an extension coil spring 54 as an biasing means for holding the swing lever 53 at the rest condition and for allowing swing movement of the swing lever 53 when the first and the second sliders 14 and 15 are relatively moved.

As shown enlarged in FIG. 8, an intermediate part of the swing lever 53 is swingably attached to the first slider 14 by a pin 501 and a snap ring 502, one end of the swing lever 53 being disposed between the first and the second contact pins 51 and 52. Further, one end of the extension coil spring 54 is turnably attached to the other end of the swing lever 53 through a screw 503 and the other end is turnably attached to the first slider 14 through a screw 504 respectively. Accordingly, the swing lever 53 is constantly biased by the extension coil spring 54 in horizontal direction.

A switching portion 55 is formed between the first contact pin 51 and the swing lever 53 and between the second contact pin 52 and the swing lever 53. The moment when the first and the second contact pins 51 and 52 touch the swing lever 53, the switching portion 55 is set "on" to capture detection value of the displacement sensor 20. On the contrary, when the first and the second contact pins 51 and 52 is not in contact with the swing lever 53, the switching portion 55 is set "off" not to capture the detection value of the displacement sensor 20. Further, the dimension between the first contact pin 51 and the swing lever 53 and between the second contact pin 52 and the swing lever 53 is set not less than 3 mm, which is set 5 mm in the present case.

In the rest condition, as shown in FIG. 9(b), since the relative movement does not occur between the first slider 14 and the second slider 15, one end of the swing lever 53 is positioned between the first and the second contact pins 51 and 52, thus maintaining rest condition. In the rest condition, since the first and the second contact pins 51 and 52 do not touch the swing lever 53, the detection value of the displacement sensor 20 is not captured.

When a more than predetermined load is applied downwardly between the first and the second sliders 14 and 15, the relative movement occurs between the sliders by the constant-pressure mechanism 30. When the relative displacement by the relative movement exceeds 5 mm, the lower portion of the first contact pin 51 touches the upper portion of the swing lever 53 and, subsequently, the swing lever 53 is swingably moved clockwise (see FIG. 9(c)).

When the more than predetermined load is applied upwardly between the first and the second sliders 14 and 15, the relative movement is occurred between the sliders by the constant-pressure mechanism 30. When the relative displacement by the relative movement exceeds 5 mm, the upper portion of the second contact pin 52 touches the lower portion of the swing lever 53 and, subsequently, the swing lever 53 is swingably moved counterclockwise (see FIG. 9(*a*)). Thus, the damage on the switch 50 can be prevented.

When the load is released from the first and the second sliders 14 and 15, the relative movement therebetween is cancelled by the constant-pressure mechanism 30, so that the swing lever 53 is horizontally urged by the extension coil spring 54 thus returning the swing lever 53 to the rest condition (see FIG. 9(*b*)).

[Clamp Mechanism 60]

Figure 10:
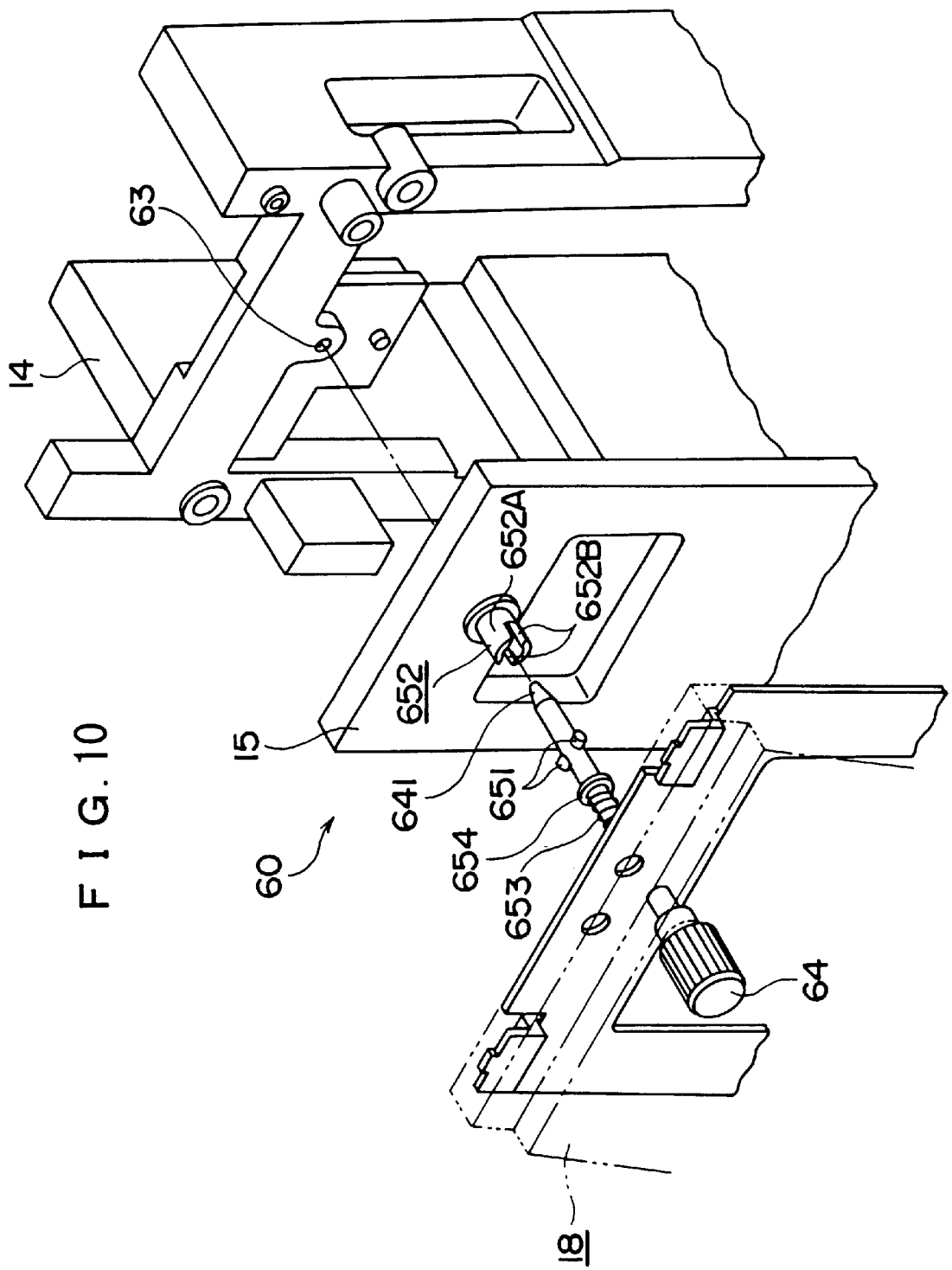
FIG. 10 is an enlarged exploded perspective view showing a clamp mechanism of the aforesaid embodiment.
Figure 11:
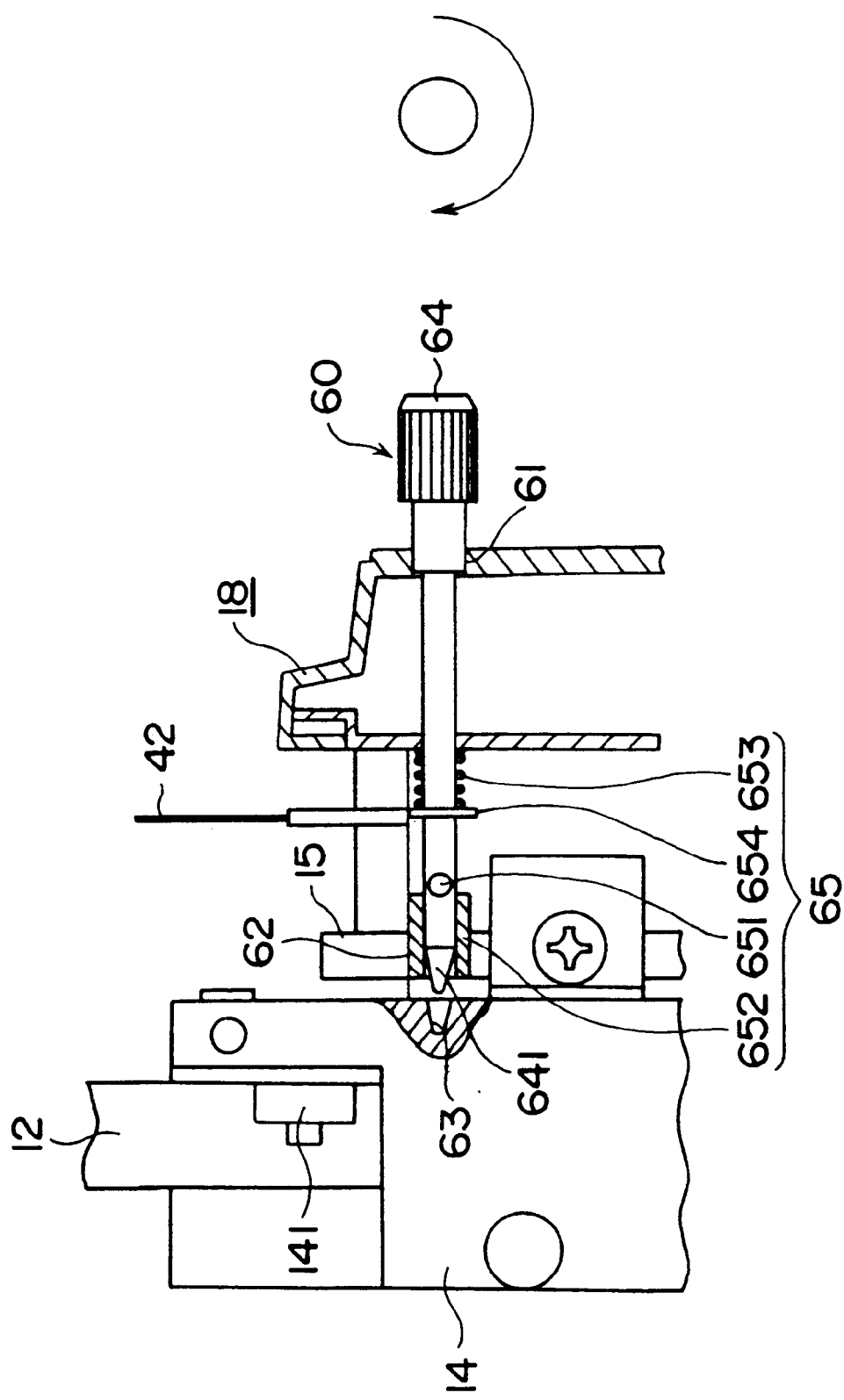
FIG. 11 is a cross section showing the clamp mechanism before clamped.
Figure 12:
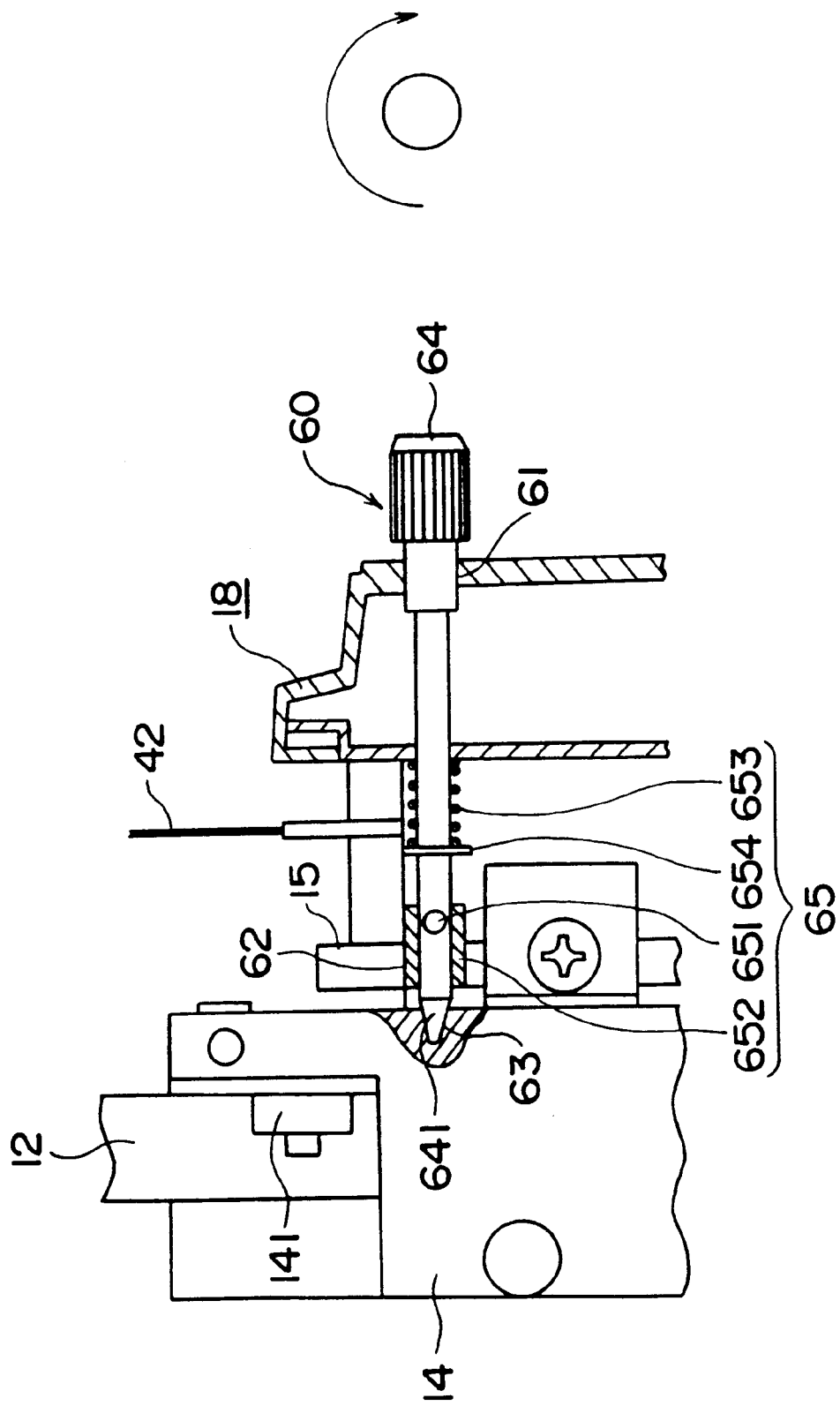
FIG. 12 is a cross section showing the clamp mechanism after clamped.

In FIGS. 10 to 12, the clamp mechanism 60 has a through-hole 61 provided to the display console 18, a through-hole 62 provided on the second slider 15 correspondingly to the through-hole 61, an engage hole 63 provided on the first slider 14 correspondingly to the through-hole 62, a clamp pin 64 inserted to the respective through-holes 61 and 62 to engage to the engage hole 63, and a clamp pin advance retainer 65 for retaining the clamp pin 64 in the display console 18 and the respective through-holes 61 and 62 of the second slider 15 and for advancing the clamp pin 64 toward the engage hole 63 of the first slider 14 when the clamp pin 64 is rotated by a predetermined angle.

The clamp pin 64 has a distal end thereof being formed in tapered shape.

The clamp pin advance retainer 65 has a positioning pin 651 perpendicularly projecting from the clamp pin 64 at mutually opposing point, a guide cylinder 652 provided along the periphery of the through-hole 62 of the second slider 15, and a helical coil spring 653 for urging the clamp pin 64 in a direction for the clamp pin 64 to advance toward the engage hole 63 of the first slider 14.

The guide cylinder 652 is composed of an outer wall 652A provided along the periphery of the through-hole 62 and a groove 652B formed along axial direction of the outer wall 652A.

The helical coil spring 653 is provided between the display console 18 and a stopper 654 provided at an intermediate part of the clamp pin 64.

Next, a function of the present embodiment will be described below.

[Ordinary Height Measurement]

For instance, a height of a workpiece (not shown) will be measured as follows. When the handle 43 of the drive mechanism 40 is operated to lower the second slider 15, the first slider 14 is lowered together by virtue of the constant-pressure mechanism 30 in the same direction. Subsequently, when the second slider 15 is further lowered after the probe 13 provided on the first slider 14 touches the workpiece, since the first slider 14 cannot be further lowered, the more than predetermined load is applied between the first and the second sliders 14 and 15. Then, the second slider 15 is moved (lowered) relative to the first slider 14 by the constant-pressure mechanism 30. When the relative movement becomes not less than 5 mm, in other words, in the switch 50, the moment when the first contact pin 51 fixed to the second slider 15 touches the swing lever 53, the switch 55 is set "on", thus capturing the detection value of the displacement sensor 20. In other words, the height dimension of the measurement surface of the workpiece in contact with the probe 13 is measured.

[Profiling Measurement]

During profiling measurement, the dimension of the workpiece is measured as follows. For measuring, for instance, a profile of an inner circumference of a hole of the workpiece (not shown), while the probe 13 is inserted to the hole, the handle 43 of the drive mechanism 40 is operated to lower the second slider 15, so that the first slider 14 is lowered together in the same direction by the constant-pressure mechanism 30. After the probe 13 touches an inner wall of the hole, the second slider 15 is further lowered. At this time, since the first slider 14 cannot be further lowered, more than predetermined load is applied between the first and the second sliders 14 and 15. Then, the second slider 15 is moved (lowered) relative to the first slider 14 by the constant-pressure mechanism 30. Then, when the relative movement becomes not less than 5 mm, in other words, in the switch 50, when the first contact pin 51 fixed on the second slider 15 is in contact with the swing lever 53, the switching portion 55 is set "on", so that the detection value of the displacement sensor 20 is captured.

In this state, since the second slider 15 is lowered not less than 5 mm relative to the first slider 14, a downward force is applied to the first slider 14 and the probe 13 by the constant-pressure mechanism 30. Accordingly, when the workpiece and/or the linear measuring machine 1 is moved horizontally in this state, the probe 13 is moved while being in contact with the inner wall of the hole. The detection value of the displacement sensor 20 is captured for every predetermined time interval during the movement, a lowermost position of the hole can be obtained by refreshing and storing the minimum value, so that the inner diameter of the hole can be calculated by lifting the probe 13 based on the position and to capture the detection value when the probe 13 is in contact with the upper portion of the inner wall of the hole.

[Marking-Off]

Further, the marking-off work can be conducted as follows. In order to mark off a workpiece (not shown), initially, the probe 13 attached to the first slider 14 is exchanged with a scriber (not shown) etc. Subsequently, the second slider 15 is lifted by operating the handle 43 of the drive mechanism 40, so that the first slider 14 and the scriber are also lifted together in the same direction by virtue of the constant-pressure mechanism 30. Thus, after the height of the scriber is set at a desired position, the handle 43 of the drive mechanism 40 is fixed to fix the position of the second slider 15.

Next, the clamp pin 64 is inserted to respective through-holes 61 and 62 on the display console 18 and the second slider 15 and the positioning pin 651 of the clamp pin 64 is touched to the periphery of the outer wall 652A of the second slider 15 (see FIG. 11). Since the clamp pin 64 is urged constantly by the helical coil spring 653 in a direction to advance toward the engage hole 63 of the first slider 14, the clamp pin 64 is advanced toward the engage hole 63 of the first slider 14 while sliding the positioning pin 651 thereof along the groove 652B by rotating the clamp pin 64 by a predetermined angle to locate the positioning pin 651 of the clamp pin 64 corresponding to the groove 652B of the guide cylinder 652. Accordingly, the tip end of the clamp pin 64 engages with the engage hole 63 of the first slider 14 (see FIG. 12), so that the display console 18, the second slider 15 and the first slider 14 are combinedly fixed.

By combinedly fixing the second slider 15 and the first slider 14, the position of the scriber attached to the first slider 14 is also fixed. Then, the marking-off work is conducted by horizontally moving the workpiece and/or the linear measuring machine 1 while keeping the scriber in contact with the workpiece.

According to the above-described present embodiment, following effect can be obtained.

Since the constant pressure mechanism 30 is composed of the extension spring 31 as the weight-balancing biasing means, the cam member 32, the engage pin 33, and the extension spring 34 as the constant-pressure biasing means, the size thereof can be reduced as compared to the conventional arrangement, having parallel disposition of three extension coil springs along a predetermined length.

Since the constant pressure biasing means for horizontally biasing the cam member 32 during lifting and lowering the second slider 15 is composed of one extension spring 34, the measurement pressure during lifting the second slider 15 and the measurement pressure during lowering the second slider 15 can be made even.

Since, in the constant-pressure mechanism 30, one end of the cam member 32 sandwiching the engage pin 33 is arranged as rotation support point and a tensile force is applied to the other end by the extension spring 34, returnability to the rest position can be accurately maintained.

When the second slider 15 moves (lowers) relative to the first slider 14 in the switch 50, the swing lever 15 is swingably moved while being in contact with the first or the second contact pins 51 and 52, the damage and failure of the swing lever 53, and the first and the second contact pins 51 and 52 can be prevented, which contributes to protection of the probe 13.

Since the first and the second contact pins 51 and 52 and the swing lever 53 constituting the switch 50 only temporarily touch with each other when the first and the second sliders 14 and 15 relatively moves during measurement, influence of the age deterioration can be considerably reduced as compared to the conventional arrangement of detecting the relative movement of the slider while slidably moving the plate spring on the resistance band. Further, since the switch 50 is composed of the first and the second contact pins 51 and 52, the swing lever 53 and the extension coil spring 54 as the biasing means, the relative displacement of the both of the sliders 14 and 15 can be securely detected with a simple arrangement.

In the switch 50, since the switching portion 55 is directly formed between the first contact pin 51 and the swing lever 53 and between the second contact pin 51 and the swing lever 53, no independent switch is necessary, thus reducing number of parts and production cost.

In the switch 50, since the biasing means for horizontally urging the swing lever 53 is composed of a single extension coil spring 54, the switch 50 can be constructed extremely inexpensively and assembling work thereof can be facilitated. Further, since the reaction force in swinging the swing lever 53 after the swing lever 53 touches the first or the second contact pins 51 and 52 can be adjusted by selecting spring force of the extension coil spring 54, so that an appropriate braking function can be obtained during ascent and descent of the second slider 15.

Since the dimension between the first contact pin 51 and the swing lever 53 and the second contact pin 52 and the swing lever 53 is set as 5 mm, the detection value of the displacement sensor 20 can be captured when the impulse or the vibration after the probe 13 touches the workpiece is stilled, so that stable measurement is possible. In other words, the dimension of the workpiece can be accurately measured without being influenced by the impulse or the vibration when the probe 13 touches the workpiece.

During profiling measurement, since the switch 50 is actuated to capture the detection value of the displacement sensor 20 when the relative movement of the first slider 14 and the second slider 15 becomes not less than 5 mm and the detection value of the displacement sensor 20 is captured at a predetermined time interval thereafter, the value of the lowermost end of the hole can be calculated by obtaining the minimum value of the captured detection value.

Since the first slider 14 and the second slider 15 can be combined by the clamp mechanism 60, the position of the probe 13 provided on the first slider 14 can be fixed by combining the first slider 14 and the second slider 15 after fixing the drive mechanism 40 to fix the second slider 15. Accordingly, for instance, marking-off work is possible by exchanging the probe 13 with a scriber etc. and horizontally moving the workpiece and/or the linear measuring machine 1 while keeping the scriber in contact with the workpiece.

Since the relative movement between the first and the second sliders 14 and 15 can be prevented by combining the first slider 14 and the second slider 15 during transportation, troubles to the constant-pressure mechanism etc. interposed therebetween can be substantially reduced.

Since the first slider 14 and the second slider 15 can be combined by inserting the clamp pin 64 to the through-hole 62 of the second slider 15 to engage with the engage hole 63 of the first slider 14, an object of the present invention can be achieved by a simple clamp mechanism 60.

Since the clamp pin 64 can be advanced toward and engaged with the engage hole 63 of the first slider 14 only by rotating the clamp pin 64 for a predetermined angle after:: being retained in the through-hole 62 of the second slider 15, the clamp pin 64 can be secured to the first and the second sliders 14 and 15 more easily and with shorter time than an arrangement where, for example, a screw hole is cut to the first and the second sliders 14 and 15 and the clamp pin is screwed thereto to advance the clamp pin to the engage hole. Furthermore, during marking-off work or transportation, the clamp pin 64 can be prevented from falling off from the first and the second sliders 14 and 15 by the clamp pin advance retainer 65.

Since the clamp pin 64 has a positioning pin 651 advancing along the groove 652B of the guide cylinder 652 by the helical coil spring 653 only by rotating the clamp pin 64 by a predetermined angle, the clamp pin 64 can be advanced along the central axis of the through-hole 62 and the engage hole 63 toward the engage hole 63, so that the clamp pin 64 can be easily engaged to the engage hole 63.

Since the distal end of the clam pin 64 is shaped in a tapered manner, even when the central axis of the clamp pin 64 inserted to the through-hole 62 of the second slider 15 and the center of the engage hole 63 of the first slider 14 are mutually shifted, the clamp pin 64 can be securely inserted to the engage hole 63 of the first slider 14.

Incidentally, the scope of the present invention is not limited to the above-described embodiment but includes variation and modification as long as an object of the present invention can be attained.

For instance, in the above embodiment, though the constant-pressure mechanism 30 is composed of the extension spring 31 as the weight-balancing biasing means, the cam member 32, the engage pin 33 and the extension spring 34 as a constant-pressure biasing means, the constant-pressure mechanism according to the present invention is not restricted to the above arrangement but may be arranged as follows.

Figure 13:
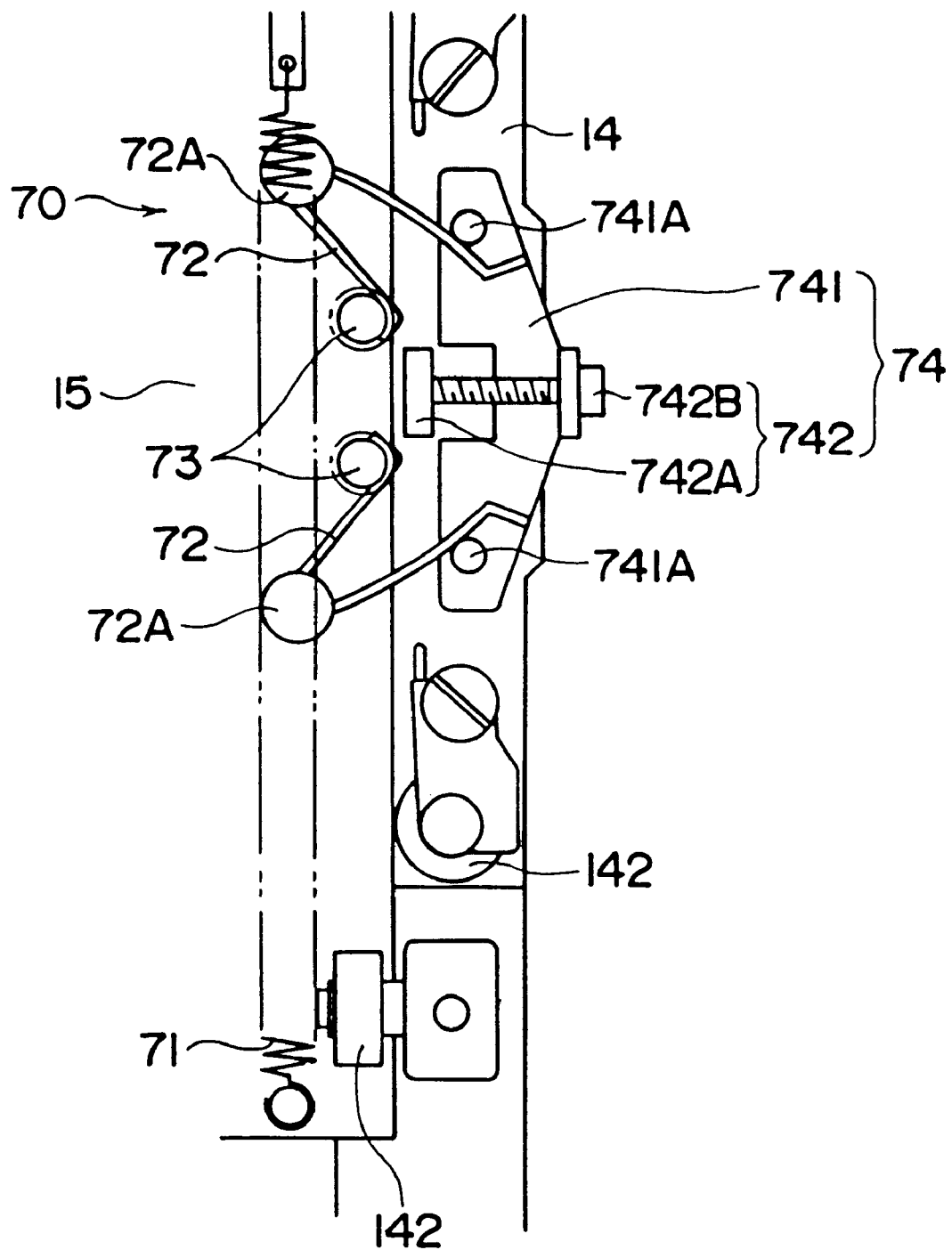
FIG. 13 is a plan view showing a modification of the constant-pressure mechanism of the aforesaid embodiment.

In FIGS. 13 and 14, the constant-pressure mechanism 70 has an extension spring 71 as the weight-balancing biasing means similar to the constant-pressure mechanism 30, a pair of plate spring 72 provided to the first slider 14 vertically spaced apart, a pair of press pin 73 disposed on the second slider 15 in contact with an elastically deformable part of the respective plate springs 72, and a spring adjustment means 74 for simultaneously adjusting a spring pressure of the pair of spring 72.

The respective plate springs 72 are formed in an approximately V-shape, a bent portion of the plate springs 72 being fixed by a screw 72A to be elastically deformable in a direction of relative movement between the first and the second sliders 14 and 15. The pair of press pin 73 is provided to a position corresponding to the pair of spring 72 vertically spaced apart, the press pins being in contact with or pressing with the same force one of the legs of the respective plate springs.

On the other hand, the spring adjustment means 74 is disposed between the pair of plate spring 71 and includes a plate 741 having a pair of adjustment pin 741A for respectively pressing the other legs of the respective plate springs 71 on upper and lower ends thereof, and a press mechanism 742 for horizontally pressing the plate 741.

Figure 15:
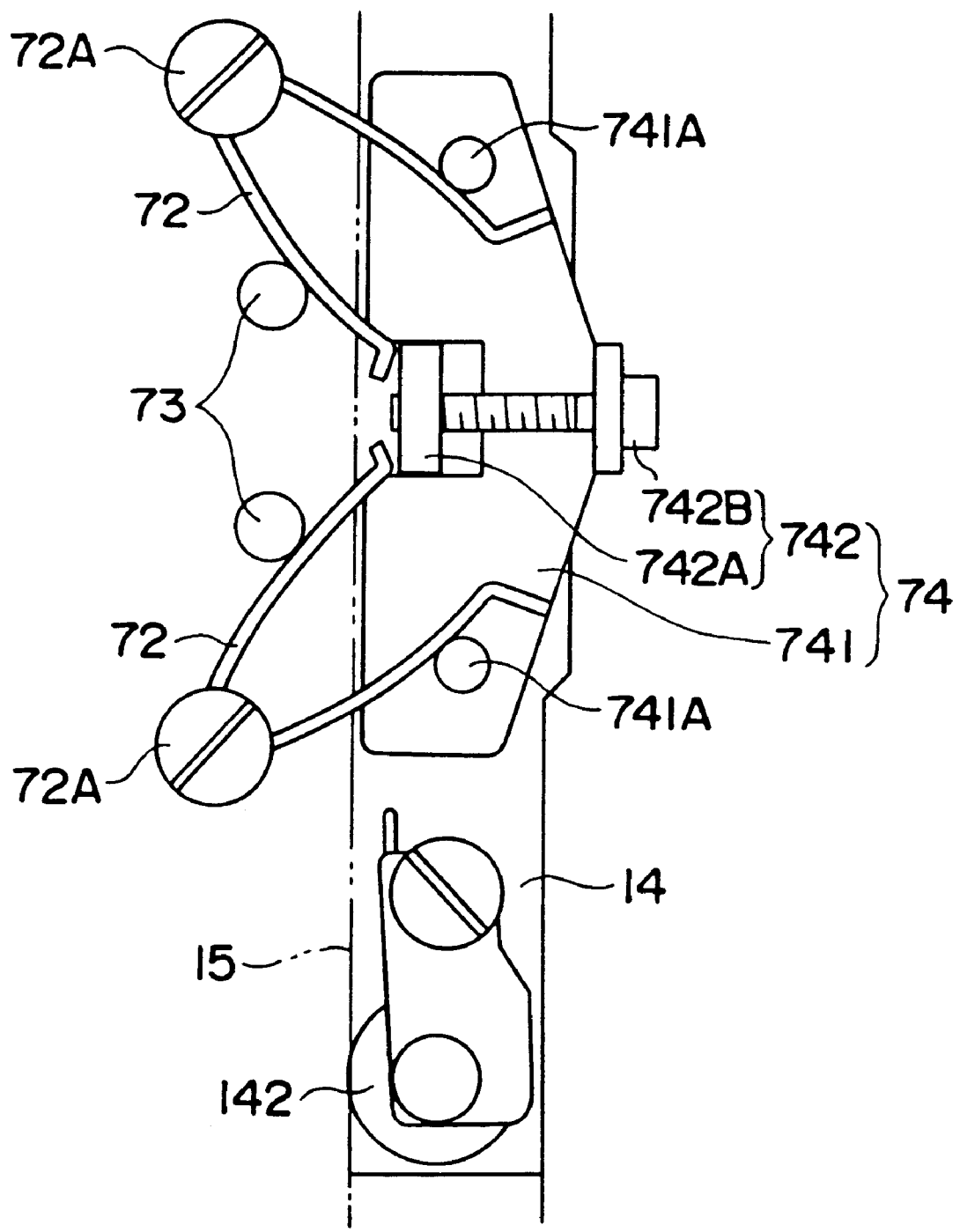
FIGS. 15(A) and 15(B) are plan views showing an effect (adjustment of spring pressure) of the modification shown in FIGS. 13 and 14.

The press mechanism 742 is composed of a screw portion 742A provided to the first slider 14 and an adjustment screw 742B to be screwed to a screw portion 742A through the plate 741. The plate 741 is horizontally pressed by rotating the adjustment screw 742B and the pair of the adjustment pin 741A of the plate 741 horizontally press the pair of plate spring 71, thus simultaneously adjusting spring pressure of the pair of plate spring 71 (see FIG. 15).

At rest position, as shown in FIG. 13, since the relative movement does not occur between the first and the second sliders 14 and 15, when the second slider 15 is vertically moved, the first slider 14 is also lifted and lowered in the same direction together. Accordingly, the pair of plate spring 72 has the same shape because no elastic deformation is occurred or the same amount of elastic deformation is caused to the pair of plate spring 72.

When the second slider 15 is further lowered after the first and the second sliders 14 and 15 are moved downwardly so that the lower portion of the probe 13 of the first slider 14 is in contact with the workpiece (not shown), since the first slider 14 cannot be further lowered, more than predetermined load is applied between the first and the second sliders 14 and 15. Then, the extension spring 71 is stretched to cause relative movement between the first slider 14 and the second slider 15. Then, respective press pins 73 of the second slider 15 is lowered to press downwardly the plate spring 72 disposed on the lower part of the first slider (see FIG. 16(a)).

Figure 16:
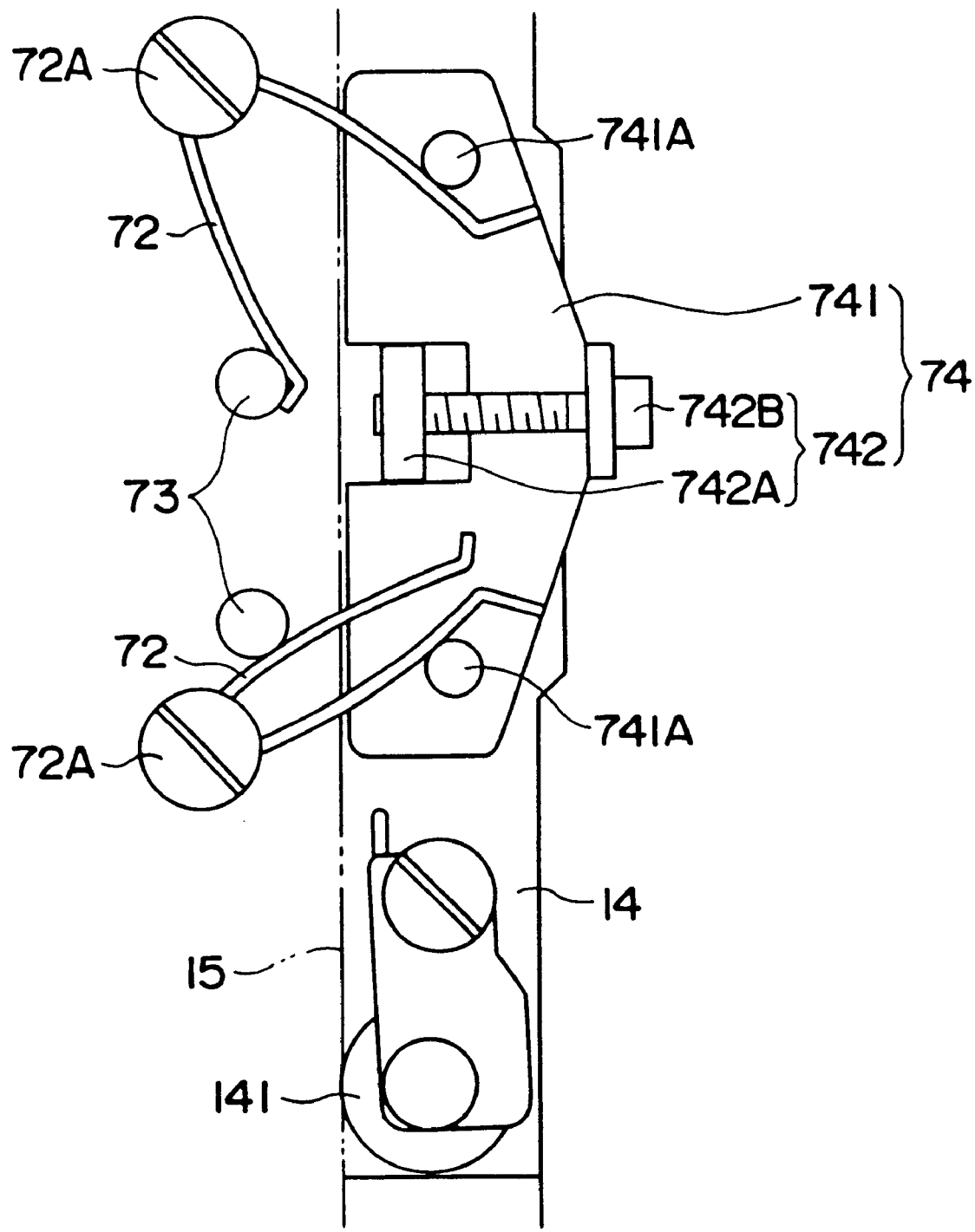
FIGS. 16(A) and 16(B) are plan views respectively showing an effect (adjustment of measurement pressure) of the modification shown in FIGS. 13 and 14.
Figure 16:
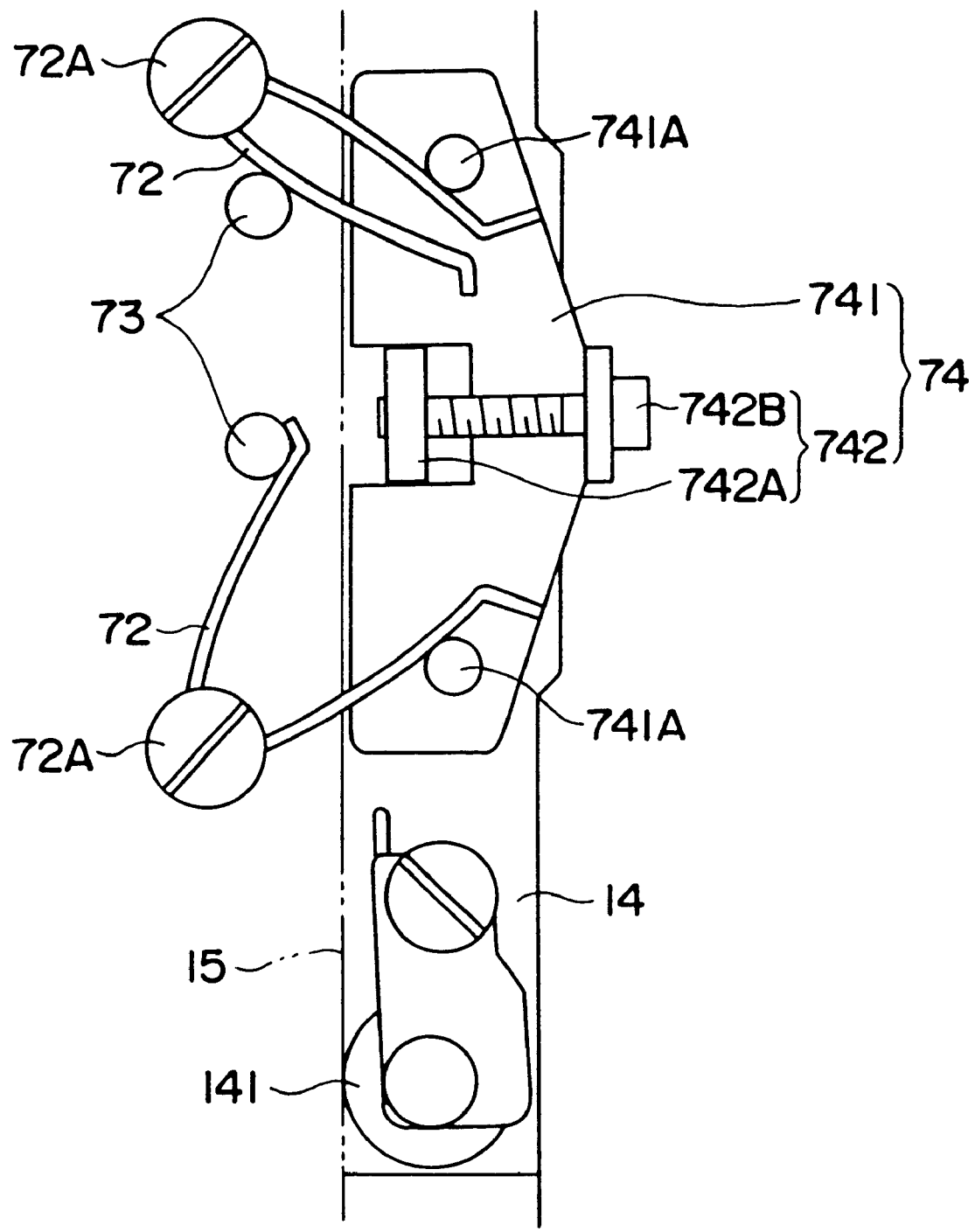

On the contrary, when the first and the second sliders 14 and 15 are moved upwardly so that the workpiece touches an upper portion of the probe 13 of the first slider 14 and, thereafter, when the second slider 15 is lifted, the respective press pins 73 of the second slider 15 is lifted to upwardly press the plate spring 72 disposed on upper side of the first slider 14 (see FIG. 16(b)).

When the load is removed from between the first and the second sliders 14 and 15, the pair of plate spring 72 presses the pair of press pins 73 upwardly or downwardly on account of elasticity for returning to the rest condition. Accordingly, since the second slider 15 is pushed back, the relative movement between the first and the second sliders 14 and 15 is cancelled to return the pair of plate spring 72 to the rest condition (see FIG. 13).

According to the above-described modification, since the constant-pressure mechanism is composed of the extension spring 71 as a weight-balancing biasing means, the pair of spring 72, and the pair of press pin 73, the size thereof can be reduced as compared to conventional arrangement having parallel three extension coil springs extending along predetermined length.

Since the spring pressure of the pair of plate spring 72 can be simultaneously adjusted by the single spring pressure adjustment means 74, adjustment work can be facilitated with economical structure.

In the present modification, though the spring pressure of the pair of plate spring 72 is adjusted by the single spring pressure adjustment means 74, the scope of the present invention is not restricted by two spring pressure adjustment means for independently adjusting the spring pressure of the pair of plate spring may be provided. In this arrangement, since the spring pressure of the pair of the plate spring can be independently adjusted, the spring pressure can be easily corrected when the measurement pressure differs in lifting the second slider and in lowering the second slider.

Further, the spring pressure of the plate spring may be adjusted not by independently providing the spring pressure adjustment means 74 but by changing strength for screwing the screw fixing the respective plate springs.

Figure 17:
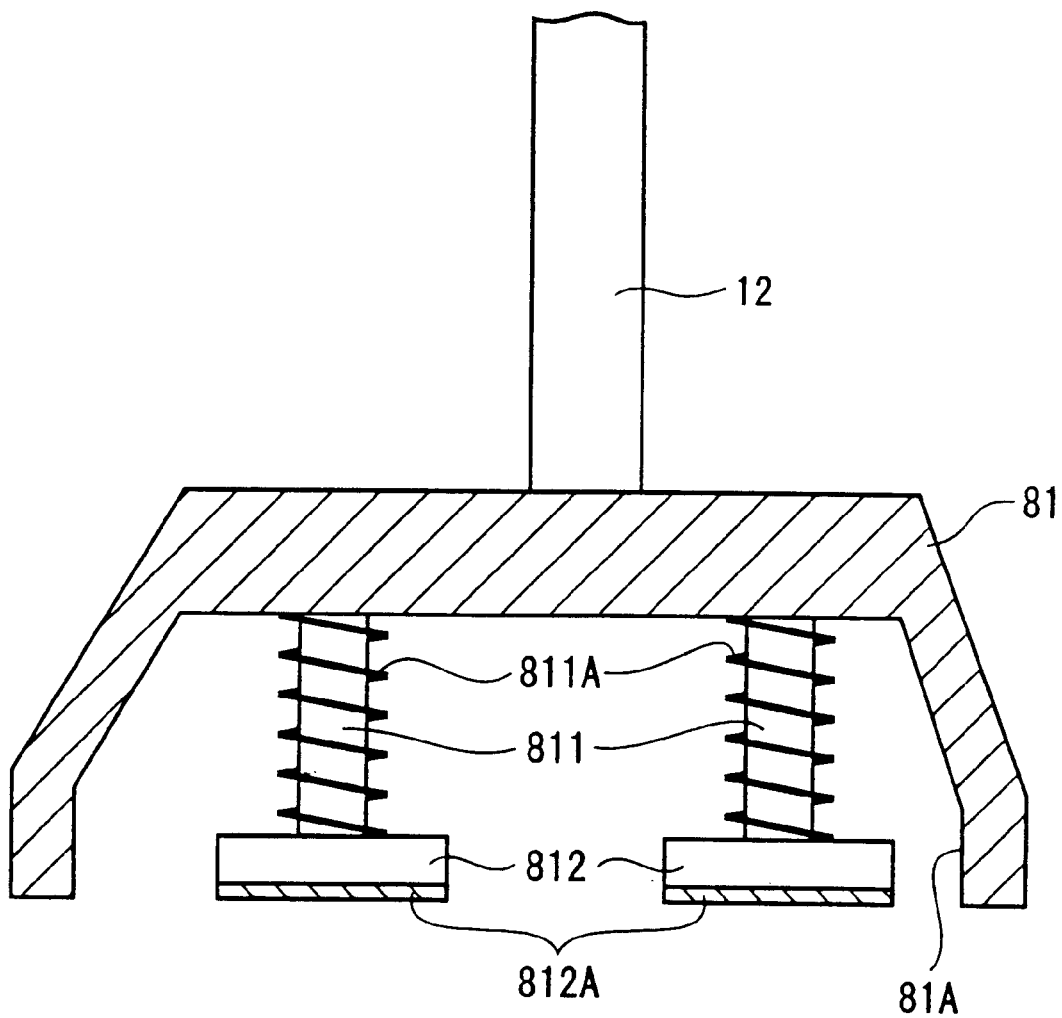
FIG. 17 is a cross section showing a modification of the base of the aforesaid embodiment.

Though the base 11 is formed in an approximate box-shape, the base according to the present invention is not restricted thereto but may be a base 81 as shown in FIG. 17 may be used.

The base 81 has a recessed portion 81A opening downwardly, the recessed portion 81A containing a shaft 811 extending vertically, and a slide pad 812 vertically slidable on the shaft 811 and having lower surface thereof in contact with a platen (not shown) etc. A helical coil spring 811A is wound around the shaft 811. The lower surface of the slide pad 812 to be in contact with the platen etc. has a low friction coefficient member 812A formed by Teflon coating etc. Accordingly, the linear measuring machine can be moved by horizontally applying relatively small force without employing air-bearing mechanism etc.

Though the respective biasing means of the above-described embodiment respectively include the extension springs 31 and 34, the extension coil spring 54 and the helical coil spring 653, the biasing means of the present invention is not restricted thereto but the biasing means may be composed of an appropriate spring or rubber etc. functioning as the biasing means.

Though the dimension between the first contact pin 51 and the swing lever 53 and between the second contact pin 52 and the swing lever 53 is set 5 mm in the aforesaid embodiment, the present invention is not restricted but may be set not less than 3 mm.

Further, though the switching portion 55 is formed between the first contact pin 51 and the swing lever 53 and the second contact pin 52 and the swing lever 53, separate switch may be provided in the present invention. However, since the number of parts can be increased by providing the separate switch, the switching portion may preferably be provided between the first contact pin and the swing lever and between the second contact pin and the swing lever.

Though the first and the second contact pins 51 and 52 are provided to the second slider 15 and the swing lever 53 and the extension coil spring 54 are provided to the first slider 14, the switch according to the present invention is not restricted to the above arrangement, but the first and the second contact pins may be provided to the first slider and the swing lever and the extension coil spring may be provided to the second slider, thus obtaining the same effect as the above embodiment.

Though the distal end of the clamp pin 64 is formed in tapered manner, the distal end of the clamp pin 64 according to the present invention may be shaped in any manner as wrong as the clamp pin is engageable to the engage hole of the first slider.

Though the clamp mechanism 60 of the aforesaid embodiment includes the clamp pin advance retainer 65, the clamp mechanism according to the present invention is, not restricted to the arrangement but the clamp pin advance retainer may not be provided. However, since the clamp pin can be easily fixed to the first and the second slider at a short time and the clamp pin can be effectively prevented from falling off from the first and the second sliders with the provision of the clamp pin advance retainer, the clamp pin advance retainer is preferably provided.

What is claimed is:

1. A linear measuring machine comprising:

a base;

a column mounted on the base;

a first slider movable vertically along the column and having a probe to be in contact with a workpiece;

a displacement sensor for detecting height position of the first slider;

a second slider provided on the first slider, the second slider being movable in the same direction as a moving direction of the first slider;

a constant-pressure mechanism for holding the first slider against the second slider, the constant-pressure mechanism moving the second slider relative to the first slider when a more than predetermined load is applied between the sliders and returning the first slider and the second slider to a rest position when the load is released;

a drive mechanism connected to the second slider for vertically moving the second slider along the column; and a switch being actuated when the second slider moves relative to the first slider to capture a detection value of the displacement sensor;

wherein an allowable relative movement amount of the first slider and the second slider is not less than 3 mm, and wherein the switch is actuated to capture the detection value of the displacement sensor when the first slider and the second slider relatively move not less than 3 mm.

2. The linear measuring machine according to claim 1, wherein the allowable relative movement amount of the first slider and the second slider is not less than 3 mm, wherein, during ordinary measurement, the switch is actuated when the first slider and the second slider relatively move not less than 3 mm to capture the detection value of the displacement sensor, and wherein, during profiling measurement, the switch is actuated when the first slider and the second slider relatively move not less than 3 mm to capture the detection value of the displacement sensor, and, thereafter, the detection value of the displacement sensor is captured at a predetermined time interval.

3. The linear measuring machine according to claim 1, the switch further comprising: a first contact pin and a second contact pin on either one of the first and the second sliders mutually spaced apart along a moving direction of the sliders; a swing lever swingably supported by the other one of the first and the second sliders, a part of the swing lever remote from a swing support point thereof being located at the center of the first contact pin and the second contact pin; and a biasing means for retaining the swing lever at a rest condition and for allowing a swing movement of the swing lever during relative movement of the first and the second sliders, the gap between the swing lever and the first contact pin and the gap between the swing lever and the second contact pin being not less than 3 mm at the rest position of the swing lever.

4. The linear measuring machine according to claim 3, wherein the biasing means includes a single extension coil spring.

5. A linear measuring machine comprising:

a base;

a column mounted on the base;

a first slider movable vertically along the column and having a probe to be in contact with a workpiece;

a displacement sensor for detecting height position of the first slider;

a second slider provided to the first slider, the second slider being movable in the same direction as a moving direction of the first slider;

a constant-pressure mechanism for holding the first slider against the second slider, the constant-pressure mechanism moving the second slider relative to the first slider when a more than predetermined load is applied between the sliders and returning the first slider and the second slider to an initial position when the load is released;

a drive mechanism connected to the second slider for vertically moving the second slider along the column; and a switch being actuated when the second slider moves relative to the first slider to capture a detection value of the displacement sensor;

the switch further comprising: a first contact pin and a second contact pin on either one of the first and the second sliders mutually spaced apart along a moving direction of the slider; a swing lever swingably supported on the other one of the first and the second sliders, a part of the swing lever remote from a swing support point thereof being located at the center of the first contact pin and the second contact pin; and a biasing means for retaining the swing lever at a rest condition and for allowing a swing movement of the swing lever during relative movement of the first and the second sliders.

6. The linear measuring machine according to claim 5, wherein a switching portion is formed between the first contact pin and the swing lever and between the second contact pin and the swing lever.

7. The linear measuring machine according to claim 5, wherein an intermediate portion of the swing lever is swingably supported by the other one of the first and the second sliders and one end of the swing lever is located at the center of the first contact pin and the second contact pin at the rest condition, and wherein the biasing means includes a single extension coil spring for stretching the other end of the swing lever perpendicularly relative to a straight line connecting the first contact pin and the second contact pin.

8. A linear measuring machine comprising:

a base;

a column mounted on the base;

a first slider movable vertically along the column and having a probe to be in contact with a workpiece;

a displacement sensor for detecting height position of the first slider;

a second slider provided to the first slider, the second slider being movable in the same direction as a moving direction of the first slider;

a constant-pressure mechanism for holding the first slider against the second slider, the constant-pressure mechanism moving the second slider relative to the first slider when a more than predetermined load is applied between the sliders and returning the first slider and the second slider to an initial position when the load is released;

a drive mechanism connected to the second slider for vertically moving the second slider along the column; and a switch being actuated when the second slider moves relative to the first slider to capture a detection value of the displacement sensor;

the constant-pressure mechanism further comprising: a weight-balancing biasing means provided between the first slider and the second slider to bias the first slider upwardly with a force equal to a total weight of the first slider and a component attached to the first slider; a cam member provided to the first slider swingably in up and down direction and having a longitudinally-extending slide groove; an engage pin provided to the second slider to slidably engage the slide groove of the cam member; and a constant-pressure biasing means for allowing swing movement of the cam member when a more than predetermined force is applied between the first and the second slider in a relative movement direction thereof.

9. The linear measuring machine according to claim 8, wherein one end of the cam member is swingably supported by the first slider and the other end of the cam member is horizontally biased by the constant-pressure biasing means sandwiching the engage pin.

10. A linear measuring machine comprising:

a base;

a column mounted on the base;

a first slider movable vertically along the column and having a probe to be in contact with a workpiece;

a displacement sensor for detecting height position of the first slider;

a second slider provided to the first slider, the second slider being movable in the same direction as a moving direction of the first slider;

a constant-pressure mechanism for holding the first slider against the second slider, the constant-pressure mechanism moving the second slider relative to the first slider when a more than predetermined load is applied between the sliders and returning the first slider and the second slider to an initial position when the load is released;

a drive mechanism connected to the second slider for vertically moving the second slider along the column; and a switch being actuated when the second slider moves relative to the first slider to capture a detection value of the displacement sensor;

the constant-pressure mechanism further comprising: a weight-balancing biasing means provided between the first slider and the second slider to bias the first slider upwardly with a force equal to a total weight of the first slider and a component attached to the first slider; a pair of plate spring disposed on either one of the first and the second sliders elastically deformable in a relative movement direction of the first and the second sliders; and a pair of press pin in contact with an elastically deformable portion of the respective plate springs, the pair of press pin being disposed on the other one of the first and the second sliders.

11. The linear measuring machine according to claim 10, further comprising a single spring pressure adjustment means for simultaneously adjusting a spring pressure of the pair of the plate spring.

12. The linear measuring machine according to claim 11, further comprising two spring pressure adjustment means for independently adjusting the spring pressure of the pair of plate spring.

13. A linear measuring machine comprising:

a base;

a column mounted on the base;

a first slider movable vertically along the column and having a probe to be in contact with a workpiece;

a displacement sensor for detecting height position of the first slider;

a second slider provided to the first slider, the second slider being movable in the same direction as a moving direction of the first slider;

a constant-pressure mechanism for holding the first slider against the second slider, the constant-pressure mechanism moving the second slider relative to the first slider when a more than predetermined load is applied between the sliders and returning the first slider and the second slider to an initial position when the load is released;

a drive mechanism connected to the second slider for vertically moving the second slider along the column;

a switch being actuated when the second slider moves relative to the first slider to capture a detection value of the displacement sensor; and a clamp mechanism for combining the first slider and the second slider.

14. The linear measuring machine according to claim 13, the clamp mechanism further comprising: a through-hole provided on the second slider; an engage hole provided on the first slider correspondingly to the through-hole; and a clamp pin passing through the through-hole to engage the engage hole.

15. The linear measuring machine according to claim 14, the clamp mechanism further comprising: a through-hole provided on the second slider; an engage hole provided on the first slider correspondingly to the through-hole; a clamp pin passing through the through-hole to engage the engage hole; and a clamp pin advance retainer for holding the clamp pin to the through-hole on the second slider and for advancing the clamp pin toward the engage hole when the clamp pin is rotated by a predetermined angle.

16. The linear measuring machine according to claim 15, the clamp pin advance retainer comprising: a positioning pin projecting perpendicularly from the clamp pin; a guide cylinder provided adjacent to the through-hole of the second slider and having a groove for the positioning pin to be engaged; and a biasing means for biasing the clamp pin in a direction for the clamp pin to advance to the engage hole.

17. The linear measuring machine according to claim 13, wherein a distal end of the clamp pin is formed in tapered shape.

* * * * *